(12) United States Patent
Aronovich et al.

(10) Patent No.: US 12,417,127 B2
(45) Date of Patent: Sep. 16, 2025

(54) MANAGING WORKLOADS IN CONTAINER POOLS

(71) Applicant: International Business Machines Corporation, Armonk, NY (US)

(72) Inventors: Lior Aronovich, Thornhill (CA); Julian Payne, Entrevaux (FR)

(73) Assignee: International Business Corporation, Armonk, NY (US)

( * ) Notice: Subject to any disclaimer, the term of this patent is extended or adjusted under 35 U.S.C. 154(b) by 616 days.

(21) Appl. No.: 17/451,798

(22) Filed: Oct. 21, 2021

(65) Prior Publication Data

US 2023/0125765 A1    Apr. 27, 2023

(51) Int. Cl.
  *G06F 9/50* (2006.01)
  *G06F 9/48* (2006.01)
  *G06N 20/00* (2019.01)

(52) U.S. Cl.
  CPC .......... *G06F 9/5055* (2013.01); *G06F 9/4887* (2013.01); *G06N 20/00* (2019.01)

(58) Field of Classification Search
  None
  See application file for complete search history.

(56) References Cited

U.S. PATENT DOCUMENTS

| | | | |
|---|---|---|---|
| 7,237,242 B2 | 6/2007 | Blythe et al. | |
| 8,095,659 B2 * | 1/2012 | Phenix | G06F 9/5027 370/466 |
| 8,185,906 B2 | 5/2012 | Muscarella | |
| 8,209,702 B1 | 6/2012 | Roytman et al. | |
| 8,352,621 B2 * | 1/2013 | Di Balsamo | G06F 9/505 709/227 |
| 9,141,430 B2 * | 9/2015 | Cherkasova | G06F 9/5038 |
| 9,262,190 B2 * | 2/2016 | Gombert | G06F 9/45533 |

(Continued)

FOREIGN PATENT DOCUMENTS

| | | |
|---|---|---|
| CN | 102509197 | 6/2012 |
| CN | 106716367 | 5/2017 |

(Continued)

OTHER PUBLICATIONS

Rolia et al. "Configuring Workload Manager Control Parameters for Resource Pools", 2006 IEEE, pp. 127-137.*

(Continued)

*Primary Examiner* — Van H Nguyen
(74) *Attorney, Agent, or Firm* — Yee & Associates, P.C.

(57) ABSTRACT

A computer implemented method for managing jobs using job processing pools. A computer system receives a job having a job type. The computer system identifies a job processing pool in the job processing pools for running the jobs of the job type, wherein the job processing pool comprises job processors for running the jobs of the job type and wherein another job processing pool in the job processing pools comprises other job processors for running the jobs of a different job type. The computer system runs the job having the job type using a job processor of the job type in the job processing pool for the job type. As a result, the illustrative embodiments can provide a technical effect of increasing the performance in running jobs in a computer system in which wait times for running jobs can be reduced.

23 Claims, 15 Drawing Sheets

(56) References Cited

U.S. PATENT DOCUMENTS

| | | | |
|---|---|---|---|
| 9,612,815 B1* | 4/2017 | Jagtap | G06F 8/61 |
| 9,921,885 B2 | 3/2018 | Antony et al. | |
| 10,013,284 B2* | 7/2018 | Di Balsamo | G06F 9/4887 |
| 10,037,230 B2* | 7/2018 | Chen | G06F 9/5027 |
| 10,268,461 B2* | 4/2019 | Boehm | G06F 8/453 |
| 10,389,598 B2 | 8/2019 | Padala et al. | |
| 10,713,092 B2* | 7/2020 | Gupta | G06F 21/6218 |
| 11,003,992 B2 | 5/2021 | Wesolowski et al. | |
| 2014/0047341 A1 | 2/2014 | Breternitz et al. | |
| 2015/0143363 A1* | 5/2015 | Gombert | G06F 9/5083 718/1 |
| 2017/0235605 A1* | 8/2017 | Chaloupka | G06F 9/4881 718/103 |
| 2018/0032373 A1* | 2/2018 | Chen | G06F 9/5038 |
| 2018/0060132 A1* | 3/2018 | Maru | G06F 9/5055 |
| 2018/0088993 A1 | 3/2018 | Gerdesmeier et al. | |
| 2018/0225155 A1* | 8/2018 | Watt, Jr. | G06F 9/5083 |
| 2020/0357483 A1* | 11/2020 | Roquet | G16B 50/50 |

FOREIGN PATENT DOCUMENTS

| | | |
|---|---|---|
| JP | 3817541 | 9/2006 |
| JP | 3944154 | 7/2007 |

OTHER PUBLICATIONS

González et al. "HerdMonitor: Monitoring Live Migrating Containers in Cloud Environments", 2020 IEEE, pp. 2180-2189.*

Lu et al. "Application-Driven Dynamic Vertical Scaling of Virtual Machines in Resource Pools", 2014 IEEE, 9 pages.*

Wang et al "Capacity and Performance Overhead in Dynamic Resource Allocation to Virtual Containers", 2007 IEEE, pp. 149-158.*

Awada et al "Improving Resource Efficiency of Container-instance Clusters on Clouds", 2017 IEEE, pp. 929-934.*

Mell et al., "The NIST Definition of Cloud Computing", Computer Security Division, National Institute of Standards and Technology, Jan. 2011, 7 pages.

Narayana et lal., "Application deployment using Containers with Auto-scaling for Microservices in Cloud Environment," Journal of Network and Computer Applications, vol. 160, 2020, 30 pages.

* cited by examiner

MANAGING WORKLOADS IN CONTAINER POOLS

BACKGROUND

1. Field

The present invention relates generally to an improved computer system and more specifically to managing workloads in container pools.

2. Description of the Related Art

With training machine learning models, model training jobs are run to train the machine learning models. These model training jobs can be submitted to a training service. The training service can receive model training jobs for running at a high frequency within a short interval of time. These jobs can complete machine learning model training in a short period of time. A requirement is present for short or immediate availability of resources to process these training jobs.

Currently, each model training job waits for resource availability in a cluster to run the model training job. The cluster can be, for example, a Kubernetes cluster that comprises nodes that run containerized applications. These containerized applications are designed to run model training jobs. When resource availability is present, a model training job is scheduled to run. The scheduling includes overhead of time in creating and initializing containers required for running the model training job. Further, the scheduling envisions processing resources that are fixed, with the calculations being focused on selecting and assigning jobs to these resources.

This type of process may not reduce wait time for running model training jobs as much as desired as the number of jobs increase in numbers and have varying frequencies.

Therefore, it would be desirable to have a method and apparatus that take into account at least some of the issues discussed above, as well as other possible issues. For example, it would be desirable to have a method and apparatus that overcome a technical problem with increasing the efficiency of running jobs, such as model training jobs.

SUMMARY

According to one illustrative embodiment, a computer implemented method for managing jobs using job processing pools is provided. A computer system receives a job having a job type. The computer system identifies a job processing pool in the job processing pools for running the jobs of the job type, wherein the job processing pool comprises job processors for running the jobs of the job type and wherein another job processing pool in the job processing pools comprises other job processors for running the jobs of a different job type. The computer system runs the job having the job type using a job processor of the job type in the job processing pool for the job type.

According to other illustrative embodiments, a computer system and a computer program product for managing jobs are provided. As a result, the illustrative embodiments can provide a technical effect of increasing the performance in running jobs in a computer system in which at least one of overall throughput of job processing is increased, wait times for running jobs is reduced, or resources held by job processors is reduced at any given time.

In running, by the computer system, the job using the job processor of the job type in the job processing pool for the job type, the illustrative embodiments can permissively run, by the computer system, the job using the job processor of the job type in the job processing pool for the job type in response to the job processor in the job processing pool for the job type being available to run the job. As a result, the illustrative embodiments can provide a technical effect of increasing the performance in running jobs in a computer system in which at least one of overall throughput of job processing is increased, wait times for running jobs is reduced, or resources held by job processors is reduced at any given time through using available job processors having the same processing type as the job. In running, by the computer system, the job using the job processor of the job type in the job processing pool for the job type, the illustrative embodiments can permissively determine, by the computer system, whether the job processor of the job type can be added to the job processing pool to run the job having the job type; add, by the computer system, the job processor of the job type to the job processing pool in response to a determination that the job processor of the job type can be added to the job processing pool to run the job having the job type and adding the job processor of the job type to the job processing pool does not exceed a set of resource limits; and run, by the computer system, the job using the job processor of the job type. As a result, the illustrative embodiments can add job processors in a manner that can provide a technical effect of increasing the performance in running jobs in a computer system in which at least one of overall throughput of job processing is increased, wait times for running jobs is reduced, or resources held by job processors is reduced at any given time while taking into account a set of resource limits. In adding, by the computer system, the job processor of the job type in response to the determination that the job processor of the job type can be added to run the job having the job type, the illustrative embodiments can permissively remove, by the computer system, a set of idle job processors to free up resources for adding the job processor and add, by the computer system, the job processor of the job type to run the job having the job type. As a result, the illustrative embodiments can provide a technical effect of increasing the performance in running jobs in a computer system in which at least one of overall throughput of job processing is increased, wait times for running jobs is reduced, or resources held by job processors is reduced at any given time at any given time by freeing up resources. In adding, by the computer system, the job processor of the job type in response to the determination that the job processor of the job type can be added to run the job having the job type, the illustrative embodiments can permissively sort, by the computer system, the job processing pools into an order based on aggregate job priorities for the job processing pools and resource requirements for the job processors in the job processing pools; remove, by the computer system, idle job processors from the job processing pools having a higher ranking in the order such that sufficient resources are available to add the job processor; and add, by the computer system, the job processor of the job type to the job processing pool. As a result, the illustrative embodiments can provide a technical effect of increasing the performance in running jobs in a computer system in which at least one of overall throughput of job processing is increased, wait times for running jobs is reduced, or resources held by job processors is reduced at any given time through removing idle jobs based on rankings of pools using aggregate priorities to free up resources to add a new job processor. In adding, by the computer system, the job processor of the job type in response to the determination that the job processor of the job type can be added to run the job having the job type, the illustrative embodiment can permissively identify, by the computer system, a set of candidate jobs having a priority lower than the job, wherein resources released by moving the set of candidate jobs are sufficient to add the job processor of the job type; place, by the computer system, the set of candidate jobs in a waiting queue; and add, by the computer system, the job processor of the job type to the job processing pool. As a result, the illustrative embodiments can provide a technical effect of increasing the performance in running jobs in a computer system in which at least one of overall throughput of job processing is increased, wait times for running jobs is reduced, or resources held by job processors are reduced at any given time by moving lower priority jobs to a wait queue to free up resources for jobs having a higher priority. The illustrative embodiments can permissively remove, by the computer system, idle job processors that have been idle beyond a threshold amount of time. As a result, the illustrative embodiments can provide a technical effect of increasing the performance in running jobs in a computer system in which at least one of overall throughput of job processing is increased, wait times for running jobs is reduced, or resources held by job processors is reduced at any given time by selectively removing idle job processors. The illustrative embodiments can permissively determine, by the computer system, a time-based job prediction for the jobs and reconcile, by the computer system, a size of the job processing pools using the time-based job prediction for the jobs. As a result, the illustrative embodiments can provide a technical effect of increasing the performance in running jobs in a computer system in which at least one of overall throughput of job processing is increased, wait times for running jobs is reduced, or resources held by job processors is reduced at any given time through using predictions of future jobs to manage job processing pools. In reconciling, by the computer system, the size of the job processing pools using the time-based job prediction for the jobs, illustrative embodiments can permissively remove, by the computer system, current job processors from the job processing pools that require a size reduction based on the time-based job prediction and add, by the computer system, new job processors to the job processing pools based on the time-based job prediction and set of resource limits. As a result, the illustrative embodiments can provide a technical effect of increasing the performance in running jobs in a computer system in which at least one of overall throughput of job processing is increased, wait times for running jobs is reduced, or resources held by job processors is reduced at any given time by selectively adding and removing job processors job processing pools based on a time-based job prediction for jobs. In adding, by the computer system, the new job processors to the job processing pools based on the set of resource limits, the illustrative embodiments can permissively determine, by the computer system, an added resource requirement for the job processing pools that require a size increase based on the time-based job prediction; responsive to a determination that adding the new job processors to the job processing pools does not exceed the set of resource limits, add, by the computer system, the new job processors; responsive to a determination that adding the new job processors to the job processing pools exceeds the set of resource limits, sort, by the computer system, the job processing pools into an order based on aggregate job priorities for the job processing pools and resource requirements for the job processors in the job processing pools based on the time-based job prediction for the jobs; and add, by the computer system, the new job processors to the job processing pools based on the order without exceeding the set of resource limits, wherein the set of resource limits is selected from one of a global resource limit, a consumer resource limit, or per container type limit. As a result, the illustrative embodiments can provide a technical effect of increasing the performance in running jobs in a computer system in which at least one of overall throughput of job processing is increased, wait times for running jobs is reduced, or resources held by job processors is reduced at any given time by taking into account resource limits when adding job processors based on a time-based job prediction for jobs. The illustrative embodiments can also permissively move, by the computer system, a current job from the job processor in the job processing pool to a dedicated job processor outside of the job processing pools in response to the current job running for a period of time that exceeds a running time threshold. As a result, the illustrative embodiments can provide a technical effect of increasing the performance in running jobs in a computer system in which at least one of overall throughput of job processing is increased, wait times for running jobs is reduced, or resources held by job processors is reduced at any given time by running jobs that have run times greater than some desire threshold running jobs in the job processing pools in a separate job processor for that job.

DETAILED DESCRIPTION

Figure 1:
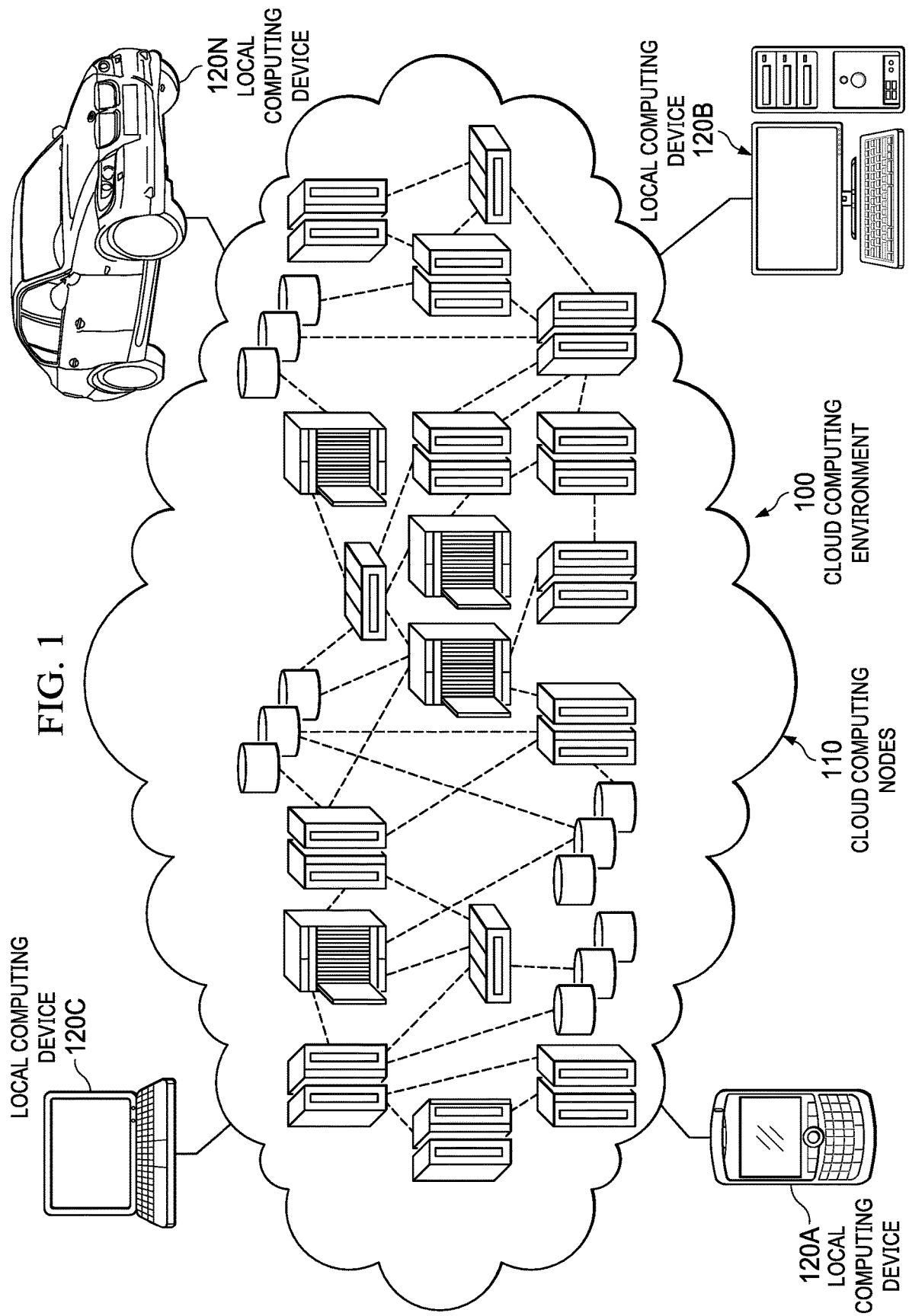
FIG. 1 is a diagram illustrating a cloud computing environment in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

With reference now to FIG. 1, a diagram illustrating a cloud computing environment is depicted in which illustrative embodiments may be implemented. In this illustrative example, cloud computing environment 100 includes a set of one or more cloud computing nodes 110 with which local computing devices used by cloud consumers, such as, for example, personal digital assistant or smart phone 120A, desktop computer 120B, laptop computer 120C, and/or automobile computer system 120N, may communicate.

Cloud computing nodes 110 may communicate with one another and may be grouped physically or virtually into one or more networks, such as private, community, public, or hybrid clouds as described hereinabove, or a combination thereof. This allows cloud computing environment 100 to offer infrastructure, platforms, and/or software as services for which a cloud consumer does not need to maintain resources on a local computing device, such as local computing devices 120A-120N. It is understood that the types of local computing devices 120A-120N are intended to be illustrative only and that cloud computing nodes 110 and cloud computing environment 100 can communicate with any type of computerized device over any type of network and/or network addressable connection using a web browser, for example.

Figure 2:
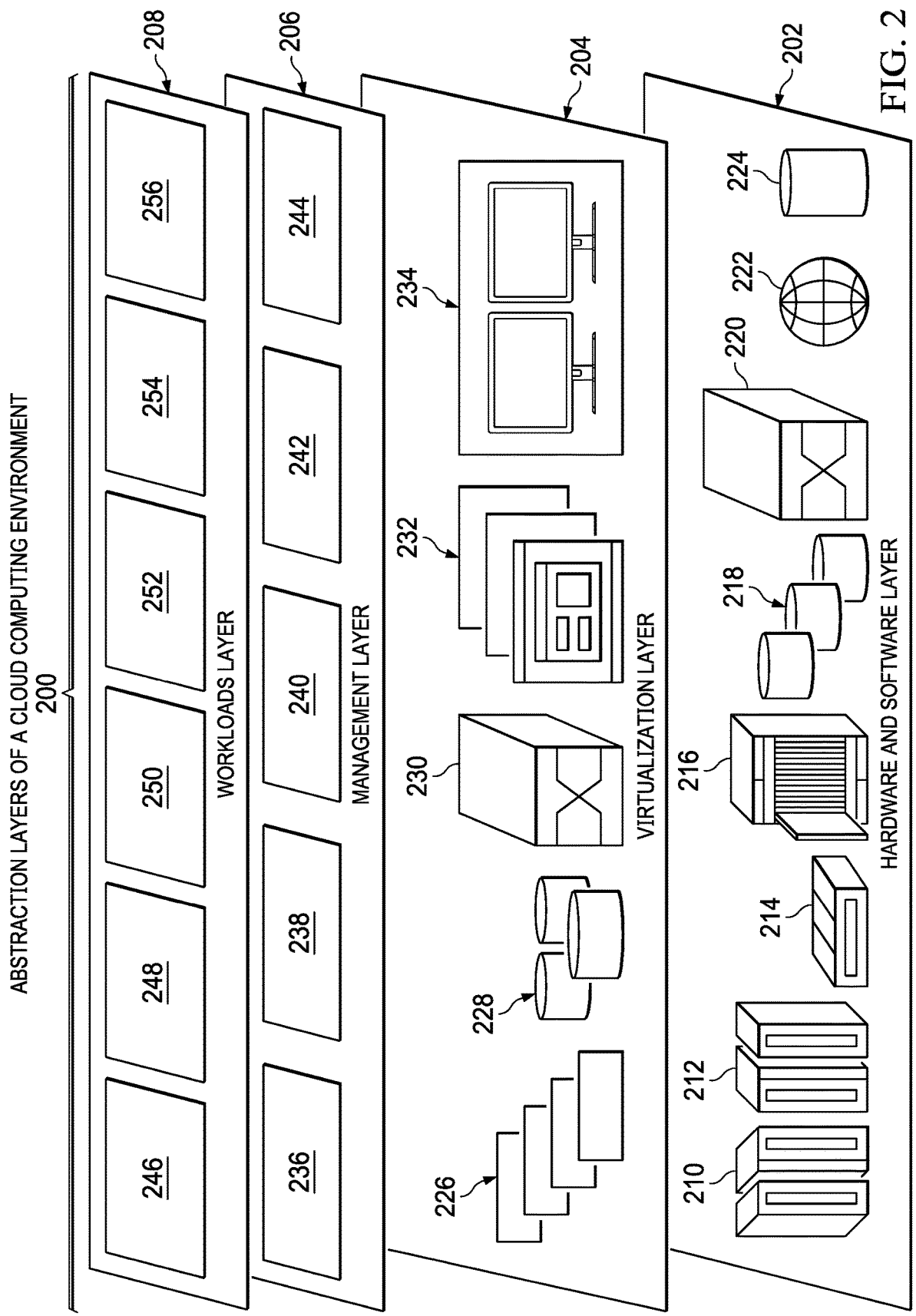
FIG. 2 is a diagram illustrating abstraction model layers in accordance with an illustrative embodiment.

With reference now to FIG. 2, a diagram illustrating abstraction model layers is depicted in accordance with an illustrative embodiment. The set of functional abstraction layers shown in this illustrative example may be provided by a cloud computing environment, such as cloud computing environment 100 in FIG. 1. It should be understood in advance that the components, layers, and functions shown in FIG. 2 are intended to be illustrative only and embodiments of the invention are not limited thereto. As depicted, the following layers and corresponding functions are provided.

Abstraction layers of a cloud computing environment 200 include hardware and software layer 202, virtualization layer 204, management layer 206, and workloads layer 208. Hardware and software layer 202 includes the hardware and software components of the cloud computing environment. The hardware components may include, for example, mainframes 210, RISC (Reduced Instruction Set Computer) architecture-based servers 212, servers 214, blade servers 216, storage devices 218, and networks and networking components 220. In some illustrative embodiments, software components may include, for example, network application server software 222 and database software 224.

Virtualization layer 204 provides an abstraction layer from which the following examples of virtual entities may be provided: virtual servers 226; virtual storage 228; virtual networks 230, including virtual private networks; virtual applications and operating systems 232; and virtual clients 234.

In one example, management layer 206 may provide the functions described below. Resource provisioning 236 provides dynamic procurement of computing resources and other resources, which are utilized to perform tasks within the cloud computing environment. Metering and pricing 238 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 240 provides access to the cloud computing environment for consumers and system administrators. Service level management 242 provides cloud computing resource allocation and management such that required service levels are met. Service level agreement (SLA) planning and fulfillment 244 provides pre-arrangement for, and procurement of, cloud computing resources for which a future requirement is anticipated in accordance with an SLA.

Workloads layer 208 provides examples of functionality for which the cloud computing environment may be utilized. Example workloads and functions, which may be provided by workload layer 208, may include mapping and navigation 246, software development and lifecycle management 248, virtual classroom education delivery 250, data analytics processing 252, transaction processing 254, and container orchestration 256.

In this example, container orchestration 256 provides a service for managing the deployment of applications in cloud computing environment 100 in FIG. 1 or a network in a physical location that accesses cloud computing environment 100 in FIG. 1. In the illustrative example, container orchestration 256 can provide automated application deployment scaling and management. For example, container orchestration 256 can automate the deployment, scaling, and operations of containers across different clusters of hosts. In this illustrative example, a container image is an executable package of software that includes all components needed to run an application. A container is a runnable instance of an image.

These containers can be grouped into pools by container orchestration 256 to run jobs. For example, container orchestration 256 can operate as a training service in which training jobs are used to train learning models.

Figure 3:
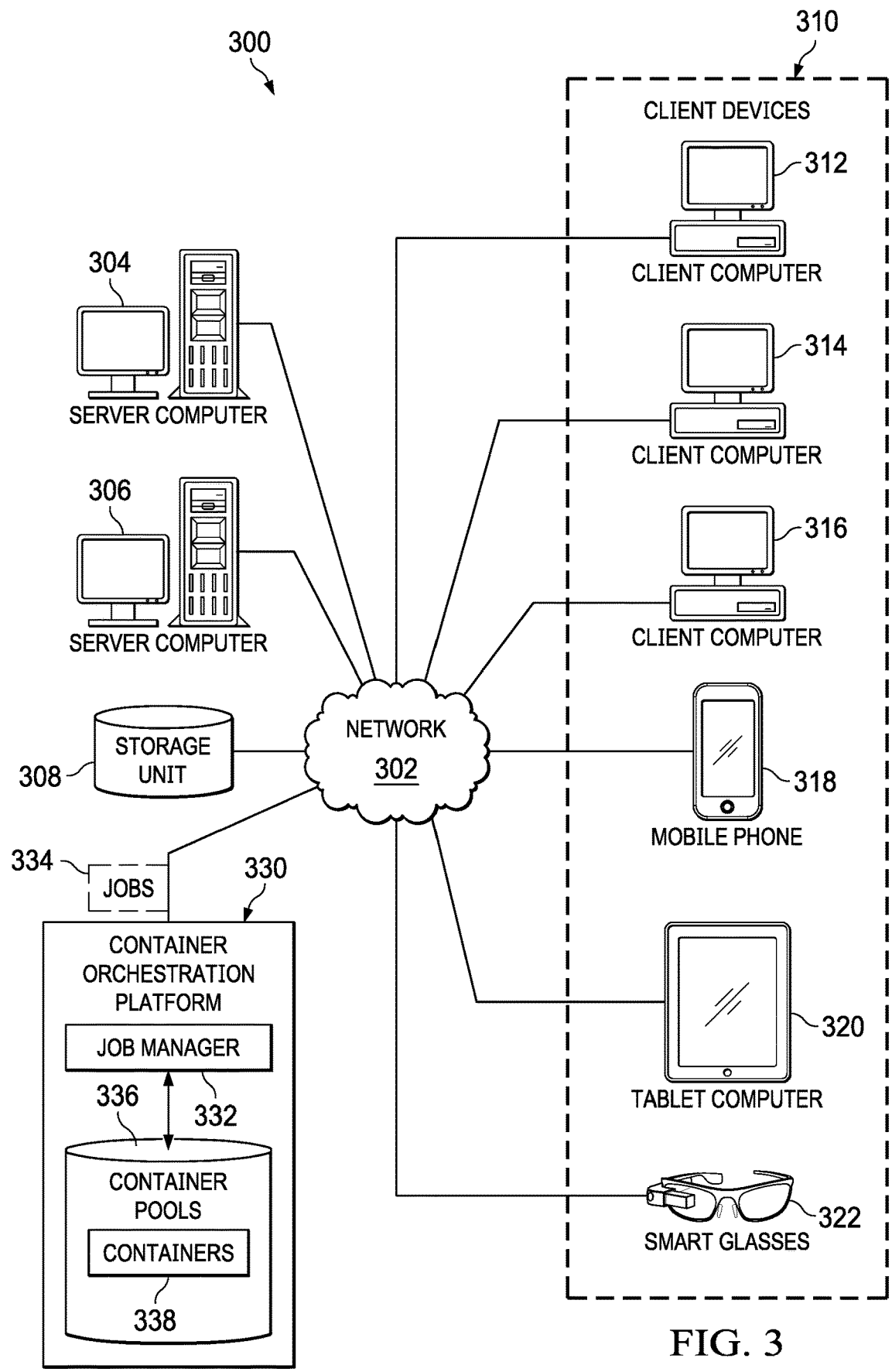
FIG. 3 is a pictorial representation of a network of data processing systems in which illustrative embodiments may be implemented.

With reference now to FIG. 3, a pictorial representation of a network of data processing systems is depicted in which illustrative embodiments may be implemented. Network data processing system 300 is a network of computers in which the illustrative embodiments may be implemented. Network data processing system 300 contains network 302, which is the medium used to provide communications links between various devices and computers connected together within network data processing system 300. Network 302 may include connections, such as wire, wireless communication links, or fiber optic cables.

In the depicted example, server computer 304 and server computer 306 connect to network 302 along with storage unit 308. In addition, client devices 310 connect to network 302. As depicted, client devices 310 include client computer 312, client computer 314, and client computer 316. Client devices 310 can be, for example, computers, workstations, or network computers. In the depicted example, server computer 304 provides information, such as boot files, operating system images, and applications to client devices 310. Further, client devices 310 can also include other types of client devices such as mobile phone 318, tablet computer 320, and smart glasses 322. In this illustrative example, server computer 304, server computer 306, storage unit 308, and client devices 310 are network devices that connect to network 302 in which network 302 is the communications media for these network devices. Some or all of client devices 310 may form an Internet-of-things (IoT) in which these physical devices can connect to network 302 and exchange information with each other over network 302.

Client devices 310 are clients to server computer 304 in this example. Network data processing system 300 may include additional server computers, client computers, and other devices not shown. Client devices 310 connect to network 302 utilizing at least one of wired, optical fiber, or wireless connections.

Program code located in network data processing system 300 can be stored on a computer-recordable storage media and downloaded to a data processing system or other device for use. For example, program code can be stored on a computer-recordable storage media on server computer 304 and downloaded to client devices 310 over network 302 for use on client devices 310.

In the depicted example, network data processing system 300 is the Internet with network 302 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 300 also may be implemented using a number of different types of networks. For example, network 302 can be comprised of at least one of the Internet, an intranet, a local area network (LAN), a metropolitan area network (MAN), or a wide area network (WAN). FIG. 3 is intended as an example, and not as an architectural limitation for the different illustrative embodiments.

As used herein, "a number of" when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Container orchestration platform 330 may be, for example, a Kubernetes® architecture, environment, or the like. However, it should be understood that description of illustrative examples using Kubernetes is meant as an example architecture only and not as a limitation on illustrative embodiments. Container orchestration platform 330 can also be referred to as a container orchestration system.

Container orchestration platform 330 provides a platform for automating deployment, scaling, and operations of customer applications, such as job manager 332. Job manager 332 runs jobs 334 received from one or more of client devices 310. Jobs 334 can be received dynamically. Further, the frequency of jobs 334 having different job types can be received at different frequencies.

Container orchestration platform 330 provides for automatic deployment, scaling, and operations of container pools 336 for use in running jobs 334. Each container pool in container pools 336 comprises a number of containers 338 for running jobs 334 received by job manager 332. Containers 338 in a container pool are for processing in jobs 334. In other words, containers 338 in a container pool are for processing a particular type of job.

A container is a runnable instance of a container image. A container image comprises an executable package of software components needed to run an application. A container is a standard unit of software for an application that packages up program instructions and all its dependencies, so the application can run on multiple computing environments. A container isolates software from the environment in which the container run and ensures that the container works uniformly in different environments. A container for an application can share the operating system kernel on a machine with other containers for other applications. As a result, an operating system is not required for each container running on the machine.

In this illustrative example, job manager 332 sends jobs 334 to different container pools to run jobs 334 based on the job types of jobs 334. By sending jobs 334 to particular container pools based on job type, job manager 332 can increase efficiency in running jobs. When a container running a job is designed or configured to run a job with the job type is more efficient in running the job as compared to running another job with a different job type, the organization of containers 338 into container pools 336 based on job type can increase throughput in job processing and reduce the wait time for availability of resources to run jobs 334.

In this illustrative example, job manager 332 can adjust the size of container pools 336 based on the types of jobs 334 received or predicted to be received for processing. Further, predictive analysis can be used to predict when jobs 334 will be received over time. This prediction can be used to make adjustments to container pools 336 to increase the efficiency in which jobs 334 are run by container orchestration platform 330.

As a result, container orchestration platform 330 can increase the performance in running jobs within network data processing system 300 in which at least one of overall throughput of job processing is increased, wait times for running jobs is reduced, or resources held by job processors is reduced at any given time.

Figure 4:
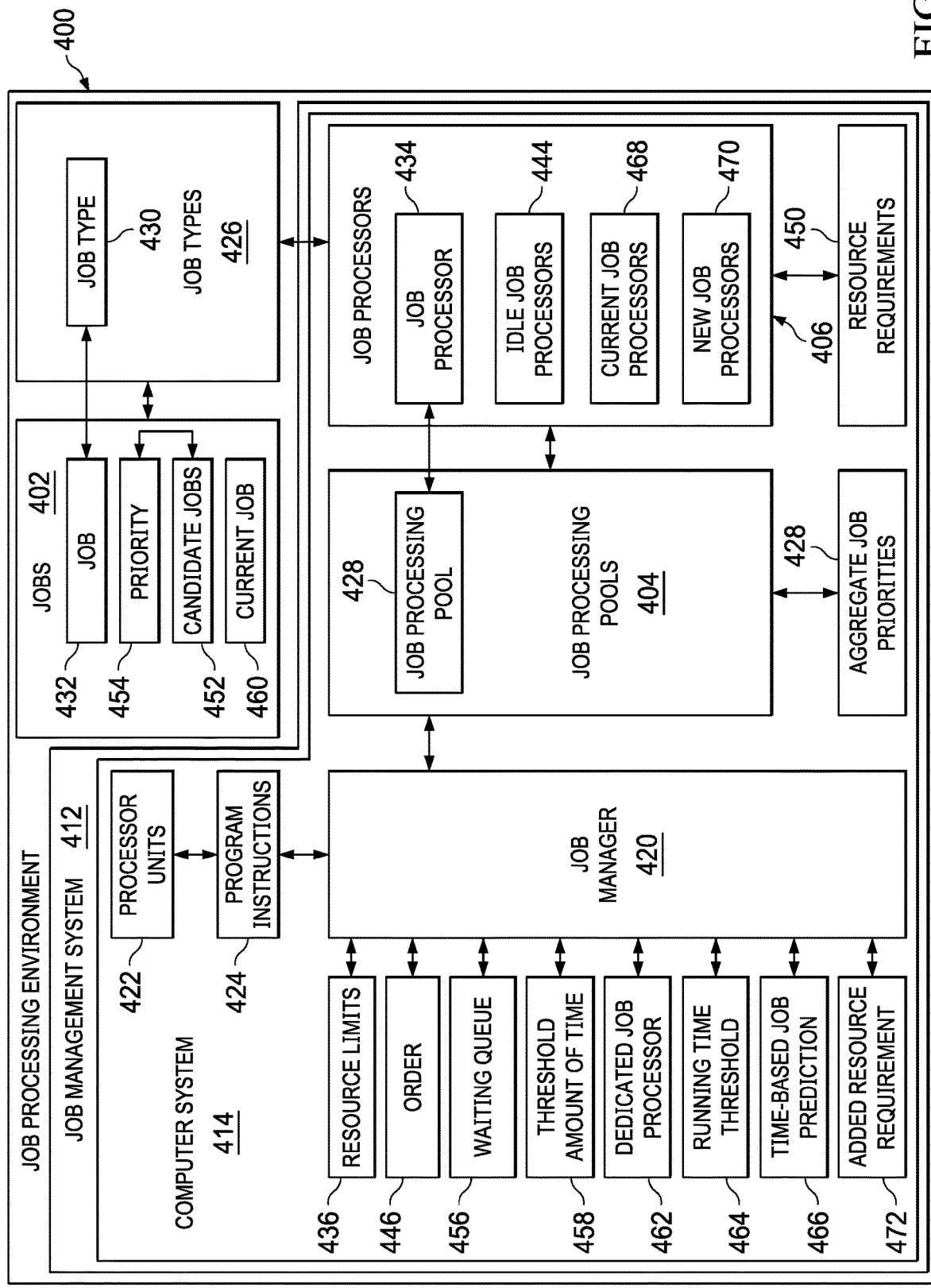
FIG. 4 is a block diagram of a job processing environment in accordance with an illustrative embodiment.

With reference now to FIG. 4, a block diagram of a job processing environment is depicted in accordance with an illustrative embodiment. In this illustrative example, job processing environment 400 includes components that can be implemented in hardware such as the hardware shown in cloud computing environment 100 in FIG. 1 and network data processing system 300 in FIG. 3.

As depicted, job processing environment 400 is an environment in which jobs 402 are processed by job processing pools 404 having job processors 406.

Jobs 402 can take a number of different forms. For example, jobs 402 can be selected from at least one of a model training job for training a machine learning model, a scheduling job for semiconductor fabrication operation, an order processing job, or other suitable types of tasks or operations.

Job processors 406 can take a number of different forms. For example, job processors 406 can be selected from at least one of a container, a thread, a process, an application, an operating system instance, a virtual machine, a host, a cluster, a processing unit, or other suitable type of processing component.

In this illustrative example, job management system 412 can manage job processing pools 404 and running jobs 402. In this illustrative example, job management system 412 comprises computer system 414 and job manager 420.

Job manager 420 is located in computer system 414 and can be implemented in software, hardware, firmware, or a combination thereof. When software is used, the operations performed by job manager 420 can be implemented in program instructions configured to run on hardware, such as a processor unit. When firmware is used, the operations performed by job manager 420 can be implemented in program instructions and data and stored in persistent memory to run on a processor unit. When hardware is employed, the hardware can include circuits that operate to perform the operations in job manager 420.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 414 is a physical hardware system and includes one or more data processing systems. When more than one data processing system is present in computer system 414, those data processing systems are in communication with each other using a communications medium. The communications medium can be a network. The data processing systems can be selected from at least one of a computer, a server computer, a tablet computer, or some other suitable data processing system.

As depicted, computer system 414 includes a number of processor units 422 that are capable of executing program instructions 424 implementing processes in the illustrative examples. As used herein, a processor unit in the number of processor units 422 is a hardware device and is comprised of hardware circuits such as those on an integrated circuit that respond and process instructions and program code that operate a computer. When a number of processor units 422 execute program instructions 424 for a process, the number of processor units 422 is one or more processor units that can be on the same computer or on different computers. In other words, the process can be distributed between processor units on the same or different computers in a computer system. Further, the number of processor units 422 can be of the same type or different type of processor units. For example, a number of processor units can be selected from at least one of a single core processor, a dual-core processor, a multi-processor core, a general-purpose central processing unit (CPU), a graphics processing unit (GPU), a digital signal processor (DSP), or some other type of processor unit.

In this illustrative example, job manager 420 in job management system 412 manages running jobs 402 using job processing pools 404 based on job types 426. Each job processing pool is configured to process jobs 402 of the same job type. For example, job processing pool 428 is for running jobs 402 of job type 430 in job types 426. Job processors 406 in job processing pool 428 in job processing pools 404 are configured or designed to run jobs 402 that are all of job type 430. In the illustrative example, another job processing pool in job processing pools 404 can comprise other job processors 406 for running jobs 402 of a different job type from job type 430 for job processors 406. As a result, different job processing pools can process jobs of different job types in job types 426.

In this illustrative example, job manager 420 can receive job 432 having job type 430. Job manager 420 can identify job processing pool 428 in job processing pools 404 for running jobs 402 of job type 430. Job processing pool 428 comprises job processors 406 for running jobs 402 of job type 430. Job manager 420 runs job 432 having job type 430 using job processor 434 in job processing pool 428 for job type 430.

In running job 432, job manager 420 can run job 432 using job processor 434 in job processing pool 428 for job type 430 in response to job processor 434 in job processing pool 428 for job type 430 being available to run job 432.

In another illustrative example, when a job processor is unavailable, job manager 420 can perform a number of different steps to run job 432. For example, job manager 420 can determine whether job processor 434 of job type 430 can be added to job processing pool 428 to run job 432 having job type 430. Job manager 420 can add job processor 434 of job type 430 to job processing pool 428 in response to a determination that job processor 434 of job type 430 can be added to job processing pool 428 to run job 432 having job type 430 and adding job processor 434 of job type 430 to job processing pool 428 does not exceed a set of resource limits 436. Job manager 420 can then run job 432 using job processor 434.

In adding job processor 434, job manager 420 can remove a set of idle job processors 444 to free up resources for adding job processor 434. In illustrative example, a job processor can be in an idle state waiting for a job or running a job. In both states, the job processor holds processing resources. Job manager 420 can add job processor 434 of job type 430 to run job 432 having job type 430 in response to freeing up resources.

In another illustrative example, in adding job processor 434, job manager 420 can sort job processing pools 404 into order 446 based on aggregate job priorities 448 for job processing pools 404 and resource requirements 450 for job processors 406 in job processing pools 404. In the illustrative example, jobs 402 can have different priorities in addition to having different job types.

An aggregate job priority can be determined for each job processing pool. The aggregate job priority for a job processing pool is the aggregate or some of the priorities for jobs being processed in the job processing pool.

Job manager 420 can remove idle job processors 444 from job processing pools 404 having a higher ranking in order 446 such that sufficient resources are available to add job processor 434. Job manager 420 can add job processor 434 of job type 430 to job processing pool 428 in response to removing idle job processors 444 such that a sufficient amount of resources are freed up.

In still another illustrative example, in adding job processor 434, job manager 420, can identify a set of candidate jobs 452 having priority 454 that is lower than jobs 402. The resources released by moving the set of candidate jobs 452 are sufficient to add job processor 434 of job type 430. In this example, job manager 420 places the set of candidate jobs 452 in waiting queue 456 and job processor 434 of job type 430 to job processing pool 428.

In managing resources, job manager 420 can also selectively remove job processors 406. For example, job manager 420 can remove job processors 406 that have been running beyond threshold amount of time 458. In another illustrative example, job manager 420 can move current job 460 from job processor 434 in job processing pool 428 to dedicated job processor 462 outside of job processing pools 404 in response to current job 460 running for a period of time that exceeds running time threshold 464.

In this illustrative example, the value for running time threshold 464 can be based on an analysis of past jobs. The selection of running time threshold 464 can be selected to run jobs that have running times longer than desired or expected in a job processor outside of job processing pools 404 such that job processors 406 in job processing pools 404 are not held for longer durations than desired or expected for processing jobs 402.

Instead, dedicated job processor 462 can be used to handle these longer running jobs. A job can run longer than expected or desired because of factors such as inputs, delays, dependencies, interactions, or other factors. As a result, job management system 412 can be optimized to process shorter running jobs that have run times shorter than running time threshold 464. Long-running jobs can be processed using job processors outside of job processing pools 404.

Additionally, job manager 420 can implement time-based job prediction 466 for predicting jobs 402 that will be submitted over time. In this illustrative example, job manager 420 can use time-based job prediction 466 to manage the numbers of job processors 406 and numbers of job processing pools 404 over different periods of time.

In this illustrative example, time-based job prediction 466 uses historical job processing data for jobs of different job types. Time-based job prediction 466 can be performed by building mathematical models that capture trends in historical job data. This model can then be used to predict future jobs. In other illustrative examples, the machine learning model can be trained using historical job data to perform time-based job prediction 466.

In one illustrative example, job manager 420 can determine time-based job prediction 466 for jobs 402. Job manager 420 can reconcile a size of job processing pools 404 using time-based job prediction 466 for jobs 402. The reconciliation can be performed by at least one of adding or removing a job processor from one or more of job processing pools 404.

In reconciling job processing pools 404, job manager 420 can remove current job processors 468 from job processing pools 404 that require a size reduction based on time-based job prediction 466. Job manager 420 can add new job processors 470 to job processing pools 404 based on time-based job prediction 466 and a set of resource limits 436. In other words, new job processors 470 can be added based on time-based job prediction 466 in which the addition of new job processors 470 do not exceed the set of resource limits 436.

In adding new job processors 470, job manager 420 can determining an added resource requirement 472 for job processing pools 404 that requires a size increase based on the time-based job prediction 466. Responsive to a determination that adding new job processors 470 to job processing pools 404 does not exceed the set of resource limits 436, job manager 420 can add new job processors 470. Responsive to a determination that adding new job processors 470 to job processing pools 404 exceeds the set of resource limits 436, job manager 420 can sort job processing pools 404 into order 446 based on aggregate job priorities 448 for job processing pools 404 and resource requirements 450 for job processors 406 in job processing pools 404 based on time-based job prediction 466 for jobs 402. Job manager 420 can add new job processors 470 to job processing pools 404 based on order 446 without exceeding the set of resource limits 436.

In one illustrative example, one or more technical solutions are present that overcome a technical problem with running jobs with a desired level efficiency. As a result, one or more technical solutions can provide a technical effect of increasing the performance in running jobs in a computer system in which at least one of overall throughput of job processing is increased, wait times for running jobs is reduced, or resources held by job processors is reduced at any given time. In the illustrative example, the overall throughput in running jobs can be increased within different time intervals. Further, the wait times across the different types of jobs also can be reduced. In other words, job processors can be made available for running jobs immediately or as soon as possible. Further, the management of container resources held across different containers can be reduced at any given time. Further, these efficiencies can take into account job priorities in running jobs.

Computer system 414 can be configured to perform at least one of the steps, operations, or actions described in the different illustrative examples using software, hardware, firmware, or a combination thereof. As a result, computer system 414 operates as a special purpose computer system in which job manager 420 in computer system 414 enables improving the efficiency at which jobs can be run by computer system 414. In particular, job manager 420 transforms computer system 414 into a special purpose computer system as compared to currently available general computer systems that do not have job manager 420.

In the illustrative example, the use of job manager 420 in computer system 414 integrates processes into a practical application for running jobs that increases the performance of computer system 414. In other words, job manager 420 in computer system 414 is directed to a practical application of processes integrated into job manager 420 in computer system 414 that identifies a job processing pool based on the job type of a job that is to be run.

The illustration of job processing environment 400 in FIG. 4 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, job processing pools 404 can have two job processing pools that process jobs 402 of the same job type. With this example, job processing pools 404 still cover processing all of job types 426 for jobs 402. Duplicate job processing pools can be present in some illustrative examples.

Figure 5:
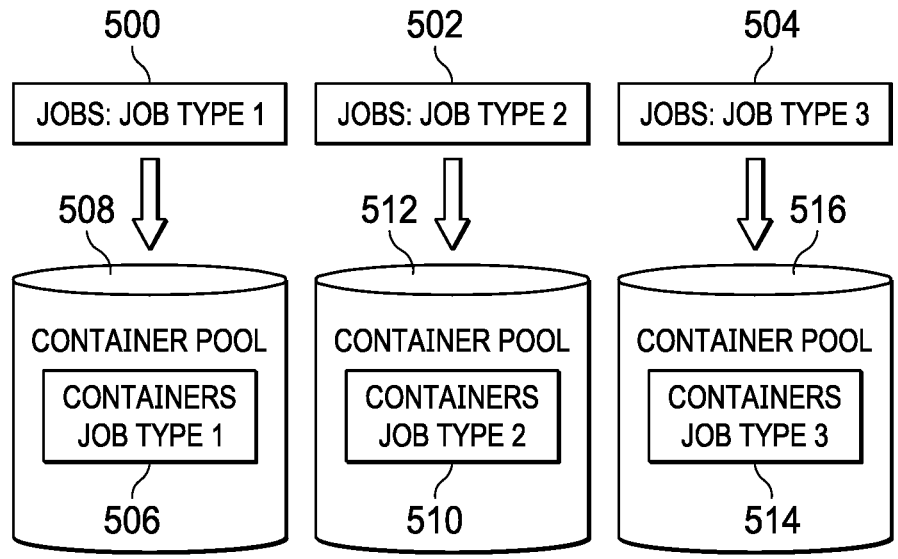
FIG. 5 is an illustration of container pools for jobs having different job types in accordance with an illustrative embodiment.

Turning next to FIG. 5, an illustration of container pools for jobs having different job types is depicted in accordance with an illustrative embodiment. In this example, jobs 500, jobs 502, and jobs 504 are examples of jobs 402 in FIG. 4. These jobs have different job types. Three unique job types are present for the jobs in this example. As depicted, jobs 500 have job type 1, jobs 502 have job type 2, and jobs 504 have job type 3.

These jobs can be run by containers, such as containers 506 in container pool 508, containers 510 in container pool 512, and containers 514 in container pool 516. These containers are examples of implementations for job processors 406 and the container pools are examples of implementations for job processing pools 404 in FIG. 4.

The containers in each container pool are unique for running a particular type of job. For example, containers 506 are for running jobs of type 1, containers 510 are for running jobs of type 2, and containers 514 are for running jobs of type 3. In this illustrative example, a container of a specific type can run a single job of the same type at any given time.

Containers 506 of job type I can run jobs 500 having job type 1. Containers 510 of job type 2 can run jobs 502 having job type 2, and containers 514 of job type 3 can run jobs 504 having job type 3.

The illustration of container types for running jobs of different types is provided as one example implementation. This illustration is not meant to limit the manner in which other illustrative examples can be implemented. For example, in other illustrative examples, the pools can contain pods that are groups of containers. In yet other illustrative examples, other types of job processors can be used such as threads, processes, virtual machines, or other suitable types of job processors. Although this example depicts three container pools, the number of container pools used can depend on the number of job types that are to be run. In this example, the types of containers associated with the types of jobs have a one-to-one relation. For example, if five types of jobs are present, five container pools can be present that have containers that are specific for running a particular job type.

Figure 6:
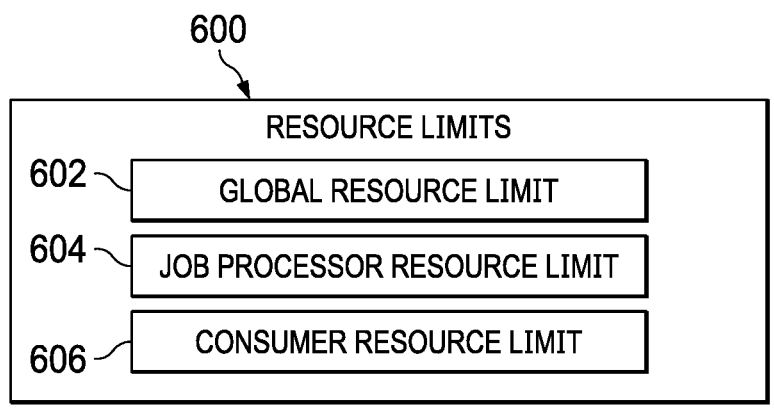
FIG. 6 is an illustration of resource limits in accordance with an illustrative embodiment.

Turning next to FIG. 6, an illustration of resource limits is depicted in accordance with an illustrative embodiment. In this illustrative example, resource limits 600 are examples of the set of resource limits 436 in FIG. 4. As depicted, resource limits 600 are selected from at least one of global resource limit 602, job processor resource limit 604, and consumer resource limit 606.

Global resource limit 602 can be a resource consumption limit for all job processors in all job processing pools. Job processor resource limit 604 can be a resource limit on each job processor. Different job processors may use different amounts of resources depending on the job type. Consumer resource limit 606 is a consumption limit and can be set for or by consumers submitting jobs. Any one or combination of these resource limits can be considered when adding job processors.

In other illustrative examples, other types of resource limits can be used in addition to or in place of resource limits 600. For example, a pool resource limit can be present in which the resource limit is set on a per job processing pool basis.

Figure 7:
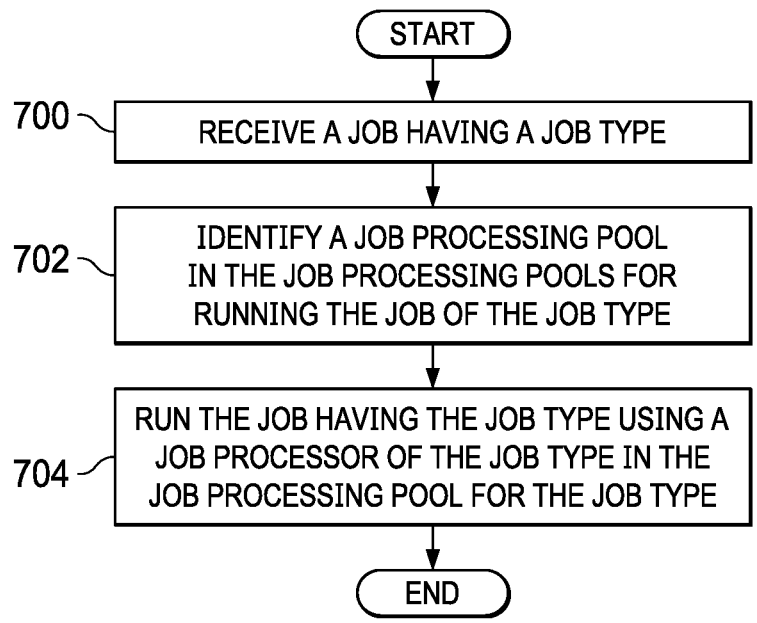
FIG. 7 is a flowchart of a process for managing jobs in accordance with an illustrative embodiment.

Turning next to FIG. 7, a flowchart of a process for managing jobs is depicted in accordance with an illustrative embodiment. The process in FIG. 7 can be implemented in hardware, software, or both. When implemented in software, the process can take the form of program instructions that is run by one of more processor units located in one or more hardware devices in one or more computer systems. For example, the process in FIG. 7 can be implemented in job manager 420 in computer system 416 in FIG. 4.

The process begins by receiving a job having a job type (step 700). The process identifies a job processing pool in the job processing pools for running the job of the job type (step 702). In step 702, the job processing pool comprises job processors for running the job of the job type and wherein another job processing pool in the job processing pools comprises other job processors for running the jobs of a different job type.

The process runs the job having the job type using a job processor of the job type in the job processing pool for the job type (step 704). The process terminates thereafter.

Figure 8:
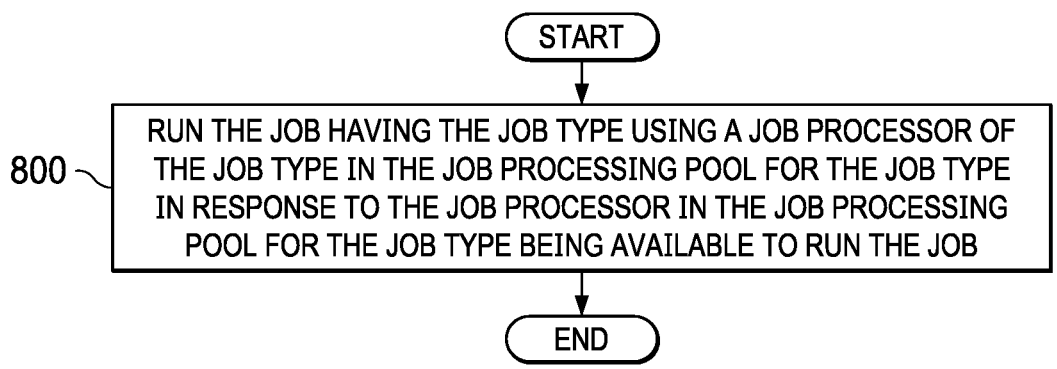
FIG. 8 is a flowchart of a process for running a job in accordance with an illustrative embodiment.

With reference now to FIG. 8, a flowchart of a process for running a job is depicted in accordance with an illustrative embodiment. This flowchart illustrates an implementation of step 704 in FIG. 7.

The process runs the job having the job type using a job processor of the job type in the job processing pool for the job type in response to the job processor in the job processing pool for the job type being available to run the job (step 800). The process terminates thereafter.

Figure 9:
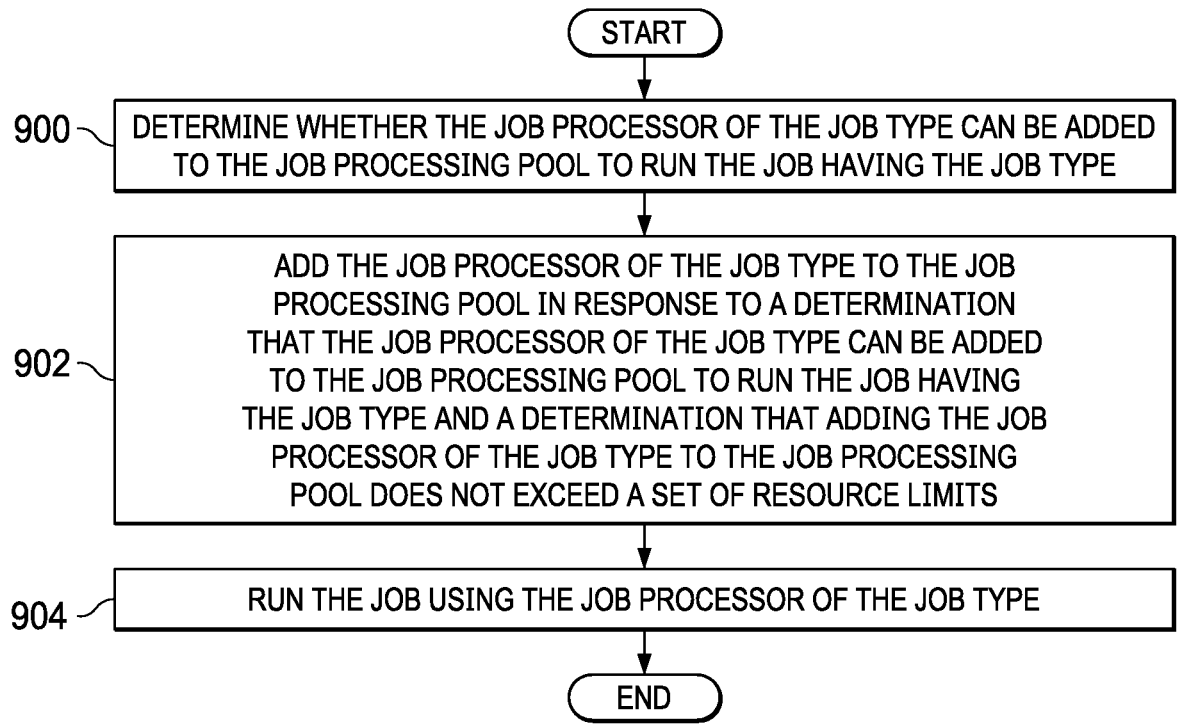
FIG. 9 is a flowchart of a process for running a job in accordance with an illustrative embodiment.

Turning to FIG. 9, a flowchart of a process for running a job is depicted in accordance with an illustrative embodiment. The process illustrated in FIG. 9 is an example of step 704 in FIG. 7.

The process begins by determining whether the job processor of the job type can be added to the job processing pool to run the job having the job type (step 900). The process adds the job processor of the job type to the job processing pool in response to a determination that the job processor of the job type can be added to the job processing pool to run the job having the job type and a determination that adding the job processor of the job type to the job processing pool does not exceed a set of resource limits (step 902).

The process runs the job using the job processor of the job type (step 904). The process terminates thereafter.

Figure 10:
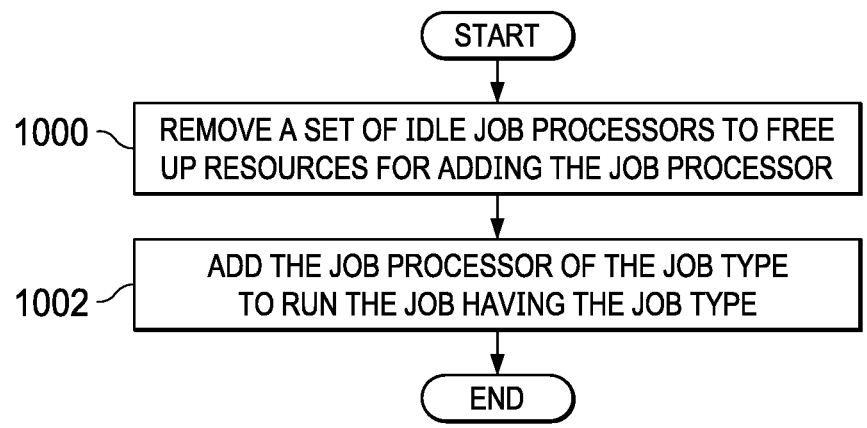
FIG. 10 is a flowchart of a process for adding a job processor in accordance with an illustrative embodiment.

Turning to FIG. 10, a flowchart of a process for adding a job processor is depicted in accordance with an illustrative embodiment. The process illustrated in FIG. 10 is an example of step 902 in FIG. 9.

The process begins by removing a set of idle job processors to free up resources for adding the job processor (step 1000). In this illustrative example, step 1000 is an optional step. The process adds the job processor of the job type to run the job having the job type (step 1002). The process terminates thereafter.

Figure 11:
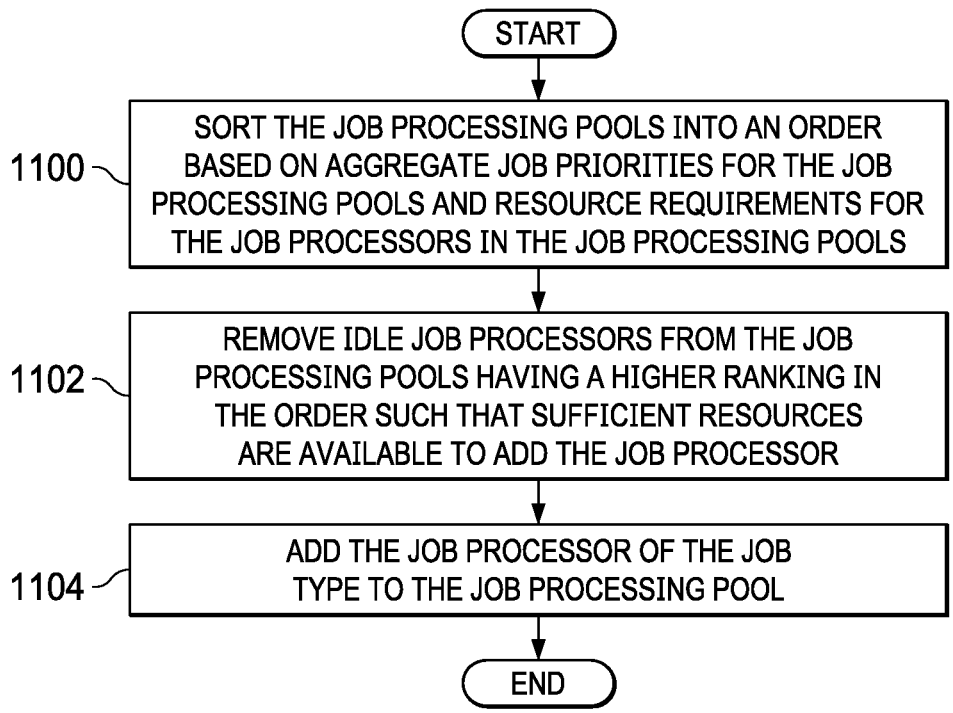
FIG. 11 is a flowchart of a process for adding a job processor in accordance with an illustrative embodiment.

In FIG. 11, a flowchart of a process for adding a job processor is depicted in accordance with an illustrative embodiment. The process illustrated in FIG. 11 is an example of step 902 in FIG. 9.

The process begins by sorting the job processing pools into an order based on aggregate job priorities for the job processing pools and resource requirements for the job processors in the job processing pools (step 1100). The process removes idle job processors from the job processing pools having a higher ranking in the order such that sufficient resources are available to add the job processor (step 1102).

The process adds the job processor of the job type to the job processing pool (step 1104). The process terminates thereafter.

Figure 12:
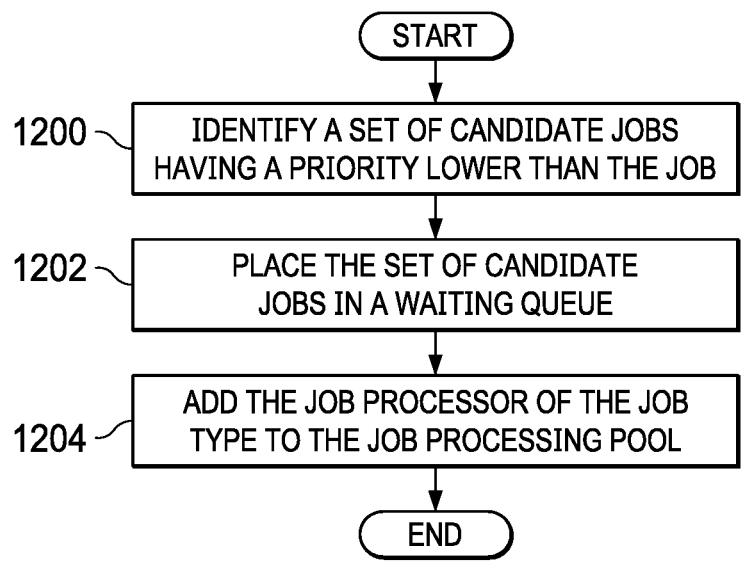
FIG. 12 is a flowchart of a process for adding a job processor in accordance with an illustrative embodiment.

With reference next to FIG. 12, a flowchart of a process for adding a job processor is depicted in accordance with an illustrative embodiment. The process illustrated in FIG. 12 is an example of step 902 in FIG. 9.

The process begins by identifying a set of candidate jobs having a priority lower than the job (step 1200). In step 1200, the resources released by moving the set of candidate jobs are sufficient to add the job processor of the job type. The process places the set of candidate jobs in a waiting queue (step 1202).

The process adds the job processor of the job type to the job processing pool (step 1204). The process terminates thereafter.

Figure 13:
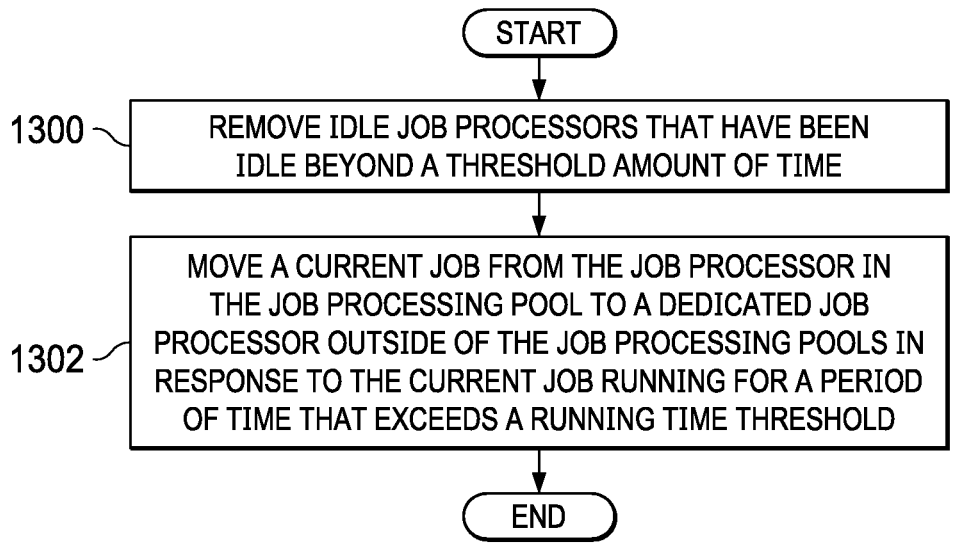
FIG. 13 is a flowchart of a process for managing resources for processing pools in accordance with an illustrative.

Turning to FIG. 13, a flowchart of a process for managing resources for processing pools is depicted in accordance with an illustrative embodiment. The process illustrated in FIG. 13 is an example of additional steps that may be used in the process in FIG. 7.

The process begins by removing idle job processors that have been idle beyond a threshold amount of time (step 1300). The process moves a current job from the job processor in the job processing pool to a dedicated job processor outside of the job processing pools in response to the current job running for a period of time that exceeds a running time threshold (step 1302). The process terminates thereafter.

In step 1302, the running time threshold can be selected based on various factors. For example, this threshold can be selected to increase performance in running jobs. In the illustrative example, the threshold can be based on an analysis of past jobs that have been run in which other running time thresholds have been used.

In this example, a job, exceeding a running time threshold, is check pointed. The job is stopped and placed into a queue to be executed using a dedicated container that is allocated and started for the job. This container is outside of the container pools. The information about the job exceeding runtime threshold is recorded. This recorded information can be used for identifying similar jobs. These types of jobs can then be diverted to a dedicated job processor without having to run within the container pools. In other words, jobs that do not fit the characteristics desired for running jobs within the container pools can be handled using a different mechanism.

In another illustrative example, the job exceeding a running time does not need to be stopped. If the priority of the job exceeding the running time threshold is high, then the job can be left running and the job processor can be removed from the processor pool.

Figure 14:
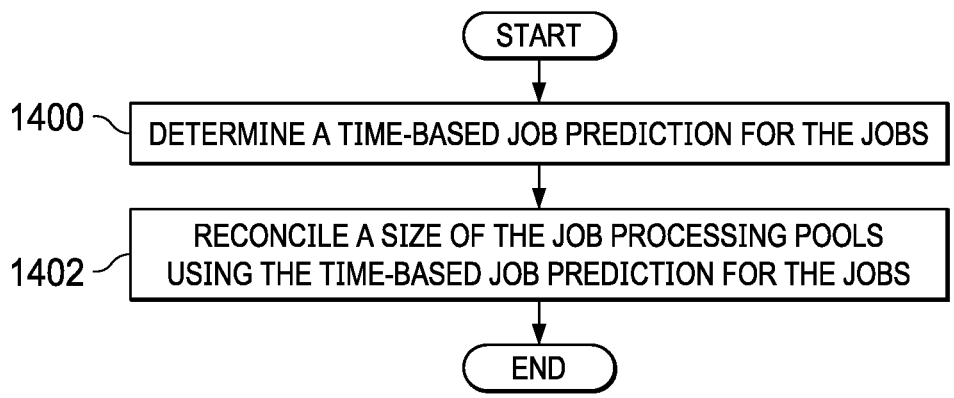
FIG. 14 is a flowchart of a process for managing jobs using time-based job prediction managing in accordance with an illustrative.

With reference to FIG. 14, a flowchart of a process for managing jobs using time-based job prediction managing is depicted in accordance with an illustrative embodiment. The process illustrated in FIG. 14 is example of additional steps that may be used in the process in FIG. 7.

The process begins by determining a time-based job prediction for the jobs (step 1400). The process reconciles a size of the job processing pools using the time-based job prediction for the jobs (step 1402). The process terminates thereafter.

Figure 15:
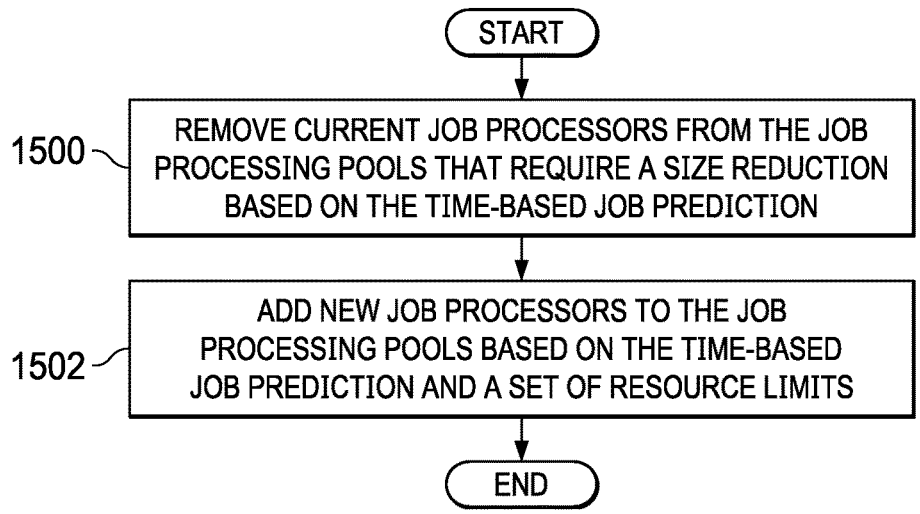
FIG. 15 is a flowchart of a process for reconciling job processing pools in accordance with an illustrative embodiment.

Turning next to FIG. 15, a flowchart of a process for reconciling job processing pool is depicted in accordance with an illustrative embodiment. The process illustrated in FIG. 15 is example of an implementation of step 1402 in FIG. 14.

The process begins by removing current job processors from the job processing pools that require a size reduction based on the time-based job prediction (step 1500). The process adds new job processors to the job processing pools based on the time-based job prediction and a set of resource limits (step 1502). The process terminates thereafter.

Figure 16:
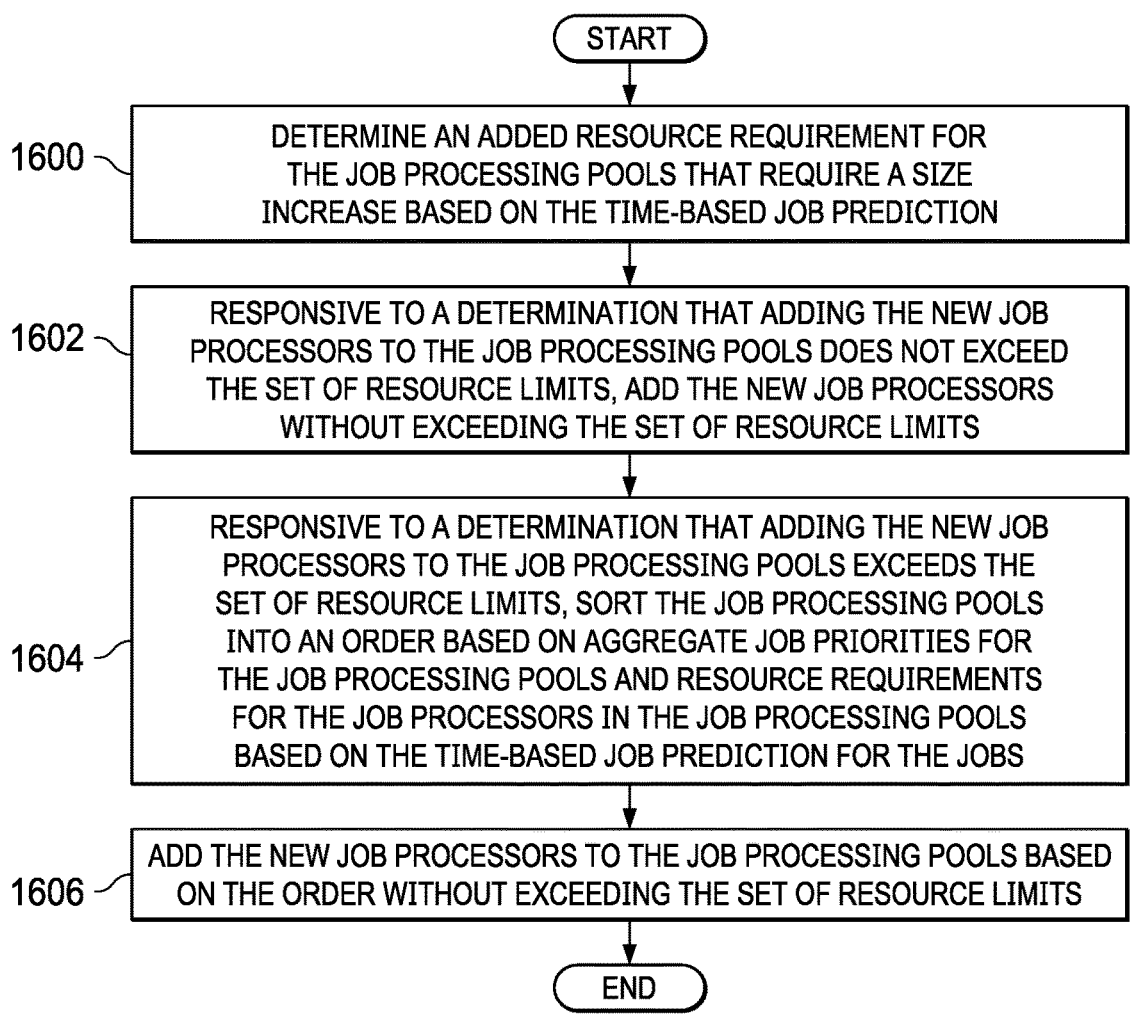
FIG. 16 is a flowchart of a process for adding new job processors in accordance with an illustrative embodiment.

Turning now to FIG. 16, a flowchart of a process for adding new job processors is depicted in accordance with an illustrative embodiment. The process illustrated in FIG. 16 is example of an implementation of step 1502 in FIG. 15.

The process begins by determining an added resource requirement for the job processing pools that require a size increase based on the time-based job prediction (step 1600). Responsive to a determination that adding the new job processors to the job processing pools does not exceed the set of resource limits, the process adds the new job processors without exceeding the set of resource limits (step 1602).

Responsive to a determination that adding the new job processors to the job processing pools exceeds the set of resource limits, the process sorts the job processing pools into an order based on aggregate job priorities for the job processing pools and resource requirements for the job processors in the job processing pools based on the time-based job prediction for the jobs (step 1604). The process adds the new job processors to the job processing pools based on the order without exceeding the set of resource limits (step 1606). The process terminates thereafter. In step 1606, the set of resource limits is selected from one of a global resource limit, a consumer resource limit, or per container type limit.

Figure 17:
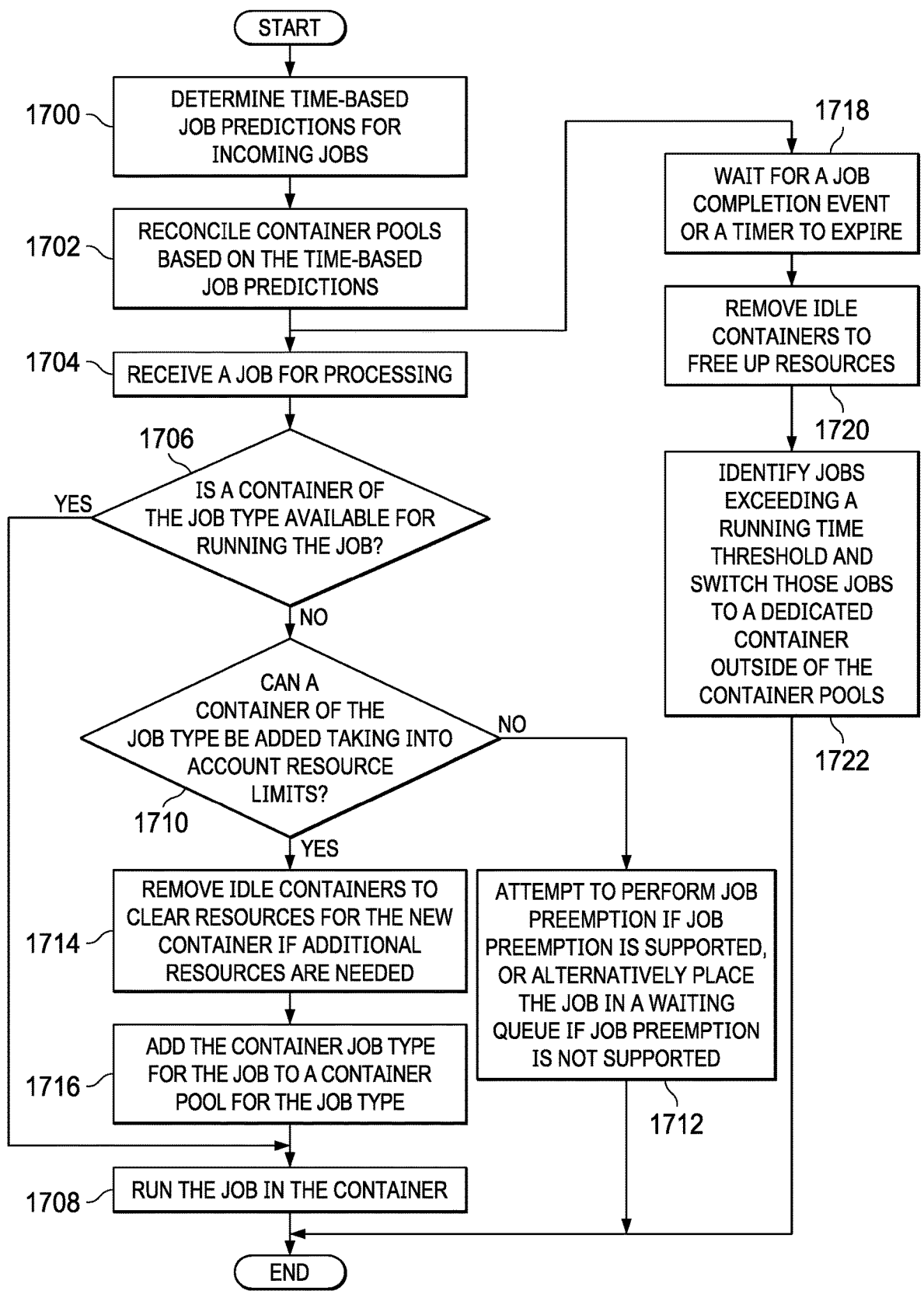
FIG. 17 is a flowchart of a process for managing jobs in accordance with an illustrative embodiment.

Turning next to FIG. 17, a flowchart of a process for managing jobs is depicted in accordance with an illustrative embodiment. The process in FIG. 17 can be implemented in hardware, software, or both. When implemented in software, the process can take the form of program instructions that is run by one of more processor units located in one or more hardware devices in one or more computer systems. For example, the process can be implemented in job manager 420 in computer system 416 in FIG. 4.

The process begins by determining time-based job predictions for incoming jobs (step 1700). The process reconciles container pools based on the time-based job predictions (step 1702). In this illustrative example, step 1700 and step 1702 are optional steps.

The process receives a job for processing (step 1704). In step 1704, the job has a job type. The process determines whether a container of the job type is available for running the job (step 1706). In step 1706, determining if there is an available container in a pool of the job type can be done by keeping track of the containers in the pool that are being used by jobs at any given time, and comparing the number of containers being used currently with the total number of containers in the pool. If a container is available, the process runs the job in the container (step 1708,) with the process terminating thereafter.

With reference again to step 1706, if a container is not available, a determination is made as to whether a container of the job type can be added taking into account resource limits (step 1710). If a container of the job type cannot be added (for example, because of exceeding resource limits), the process attempts to perform job preemption if job preemption is supported, or alternatively places the job in a waiting queue if job preemption is not supported (step 1712). The process for job preemption is described in FIG. 21 below. The process terminates thereafter.

With reference again to step 1710, If a container of the job type can be added, the process removes idle containers to clear resources for the new container if additional resources are needed (step 1714).

The process adds the container of the job type for the job to a container pool for the job type (step 1716). The process then proceeds to step 1708 as described above.

Additionally, from step 1702, the process waits for a job completion event or a timer to expire (step 1718). Upon receiving a job completion event or the expiration of a timer, the process removes idle containers to free up resources (step 1720). The target for removal of idle containers can be specified, for example, in terms of a requested amount of resources that should be freed, a requested number of idle containers that should be removed, or an idleness related threshold on the containers to be removed (for example, being idle beyond a time threshold). The process identifies jobs exceeding a running time threshold and switches those jobs to a dedicated container outside of the container pools (step 1722). The process terminates thereafter.

Figure 18:
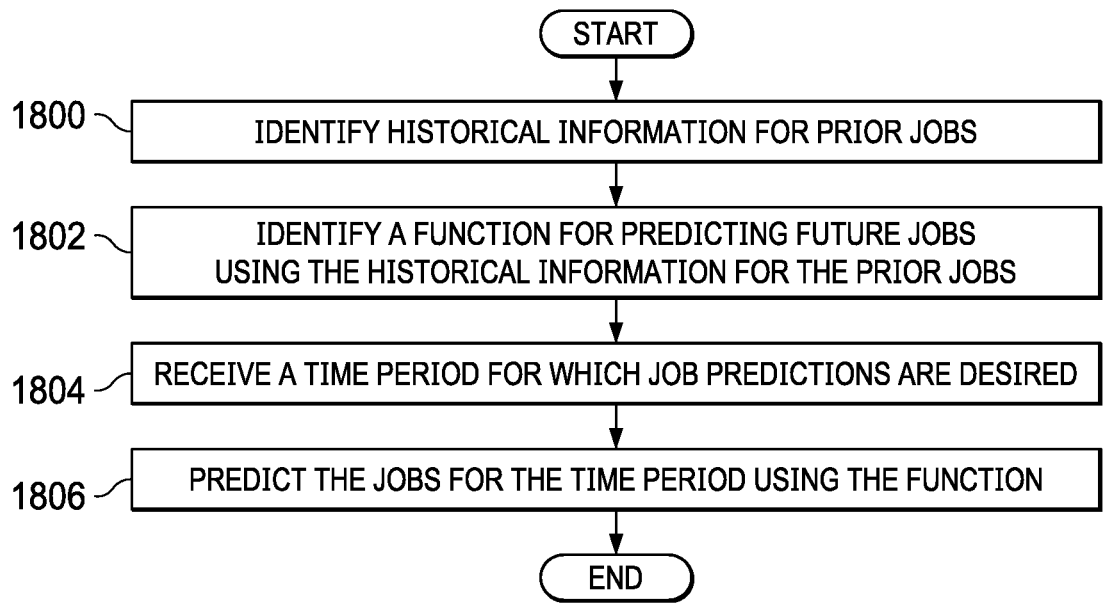
FIG. 18 is a flowchart of process for performing time-based job prediction in accordance with an illustrative embodiment.

With reference now to FIG. 18, a flowchart of process for performing time-based job prediction is depicted in accordance with an illustrative embodiment. The process in FIG. 18 is an example of one implementation for step 1700 in FIG. 17.

The process begins by identifying historical information for prior jobs (step 1800). In step 1800, the historical information for each job includes attributes such as (1) the calendar time when the job came in; (2) the type of job and associated type of container for running the job; (3) the priority of the job; and (4) processing metrics such as: wait time, run time, and resources consumed. The process identifies a function for predicting future jobs using the historical information for the prior jobs (step 1802).

The process receives a time period for which job predictions are desired (step 1804). The process predicts the jobs for the time period using the function (step 1806). The process terminates thereafter.

In this illustrative example, output from the function can be predicted jobs for the time period. The predicted jobs can be in tuples for time intervals within the period of time. Each tuple can include the container type required and the number of containers required. These tuples can be summarized or combined to identify container type, and aggregated number of containers required for the container type during the period of time.

Figure 19:
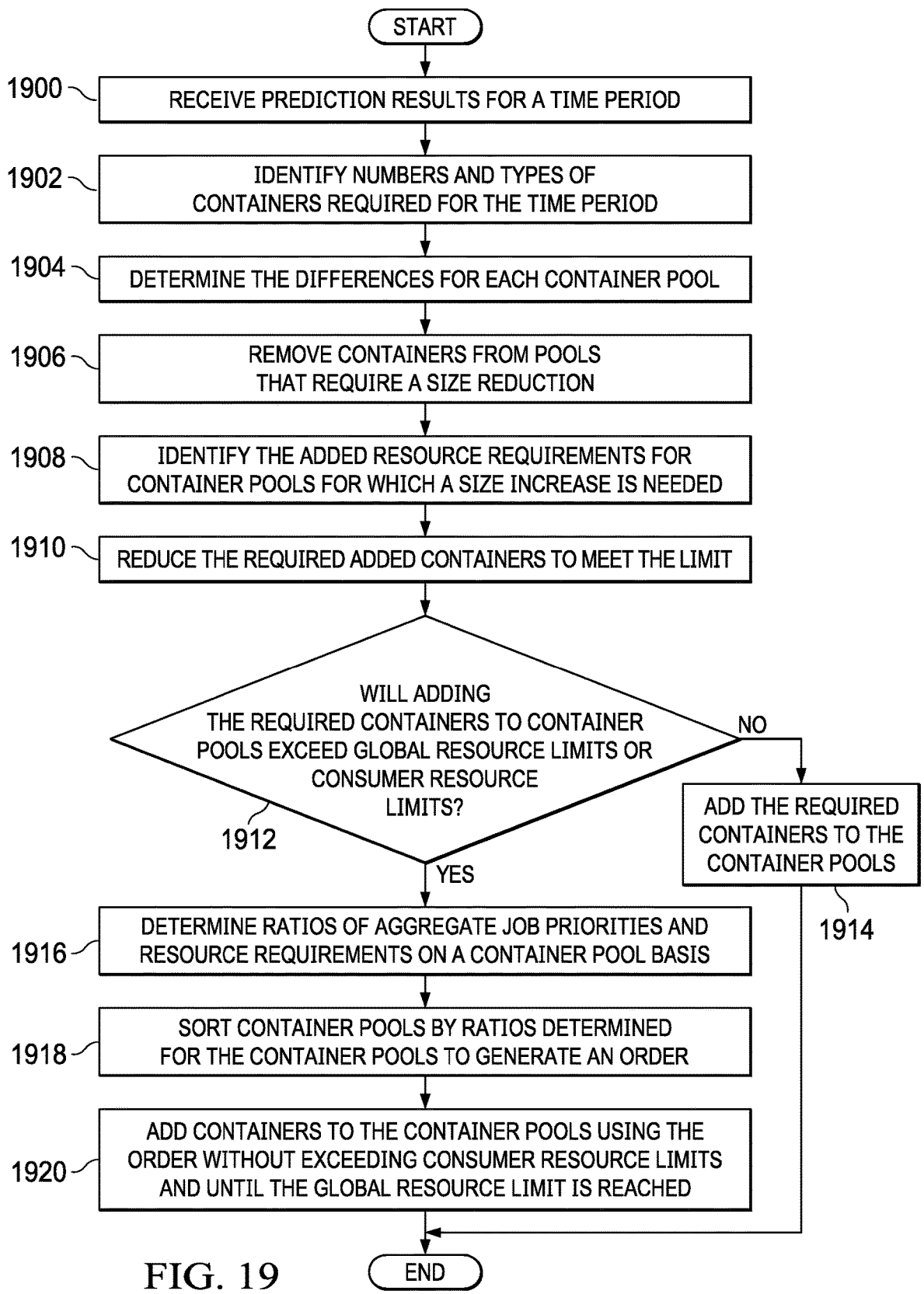
FIG. 19 is a flowchart of process for reconciling container pools in accordance with an illustrative embodiment.

Turning to FIG. 19, a flowchart of process for reconciling container pools is depicted in accordance with an illustrative embodiment. The process in FIG. 19 is an example of one implementation for step 1702 in FIG. 17. In this illustrative example, the time-based job prediction can be used to reconcile the current sizes of the pools to the predicted sizes, for the upcoming time period. This reconciliation can take into account the various resource limits. The process can add containers to pools for which the prediction is higher than their current size, and remove containers from pools for which the prediction is lower than their current size. In this illustrative example, container pools can also be emptied and can be removed if the job type for container pools is absent in the prediction for the time period. If the predicted pool size is the same as the current pool size, the container pool size is not changed. Further if resource limits are reached, the process can select which container pools to add containers to using a benefit to cost metric calculated for the pools.

The process begins by receiving prediction results for a time period (step 1900). The process identifies numbers and types of containers required for the time period (step 1902). For example, during a particular period of time, the prediction can indicate that 10 containers of job type A are needed, 5 containers of job type B are needed, and 17 containers of job type C are needed.

The process determines the differences for each container pool (step 1904). In step 1904, the difference can be determined by subtracting the current size of each container pool from the predicted size of each container pool. The process removes containers from pools that require a size reduction (step 1906).

The process then identifies the added resource requirements for container pools for which a size increase is needed (step 1908). In step 1908, additional resources that are needed to run the required containers are determined.

For each container pool from which the required added containers for the container pool exceeds the container pool-based limit, the process reduces the required added containers to meet the limit (step 1910). In step 1910, individual limits can be placed on different container pools to limit the containers for particular job types. This type of limit is a container pool-based limit.

The process determines whether adding the required containers to container pools exceed global resource limits or consumer resource limits (step 1912). If a determination is made that adding required containers to container pools will not exceed global resource limits and consumer resource limits, the process adds the required containers to the container pools (step 1914). The process terminates thereafter.

With reference again to step 1912, if adding the required containers to container pools exceeds the global resource limits or the consumer resource limits, the process determines ratios of aggregate job priorities and resource requirements on a container pool basis (step 1916). In step 1916, the job priorities assigned to jobs are aggregated for each container pool during a period of time to provide an aggregate (e.g. average, mean, or median) job priority for each one of the container pools. The aggregate job priority for each container pool is divided by the resource requirement of a container of the container type of the container pool. In the illustrative example, a higher ratio indicates a better benefit to cost ratio as compared to a lower ratio.

The process sorts container pools by ratios determined for the container pools to generate an order (step 1918). In step 1918, the ranking of the container pools can be in descending order from the highest ratio to the lowest ratio. The higher ranked container pools are the better candidates for adding containers with respect to benefit versus cost for adding containers.

The process adds containers to the container pools using the order without exceeding consumer resource limits and until the global resource limit is reached (step 1920). The process terminates thereafter.

Figure 20:
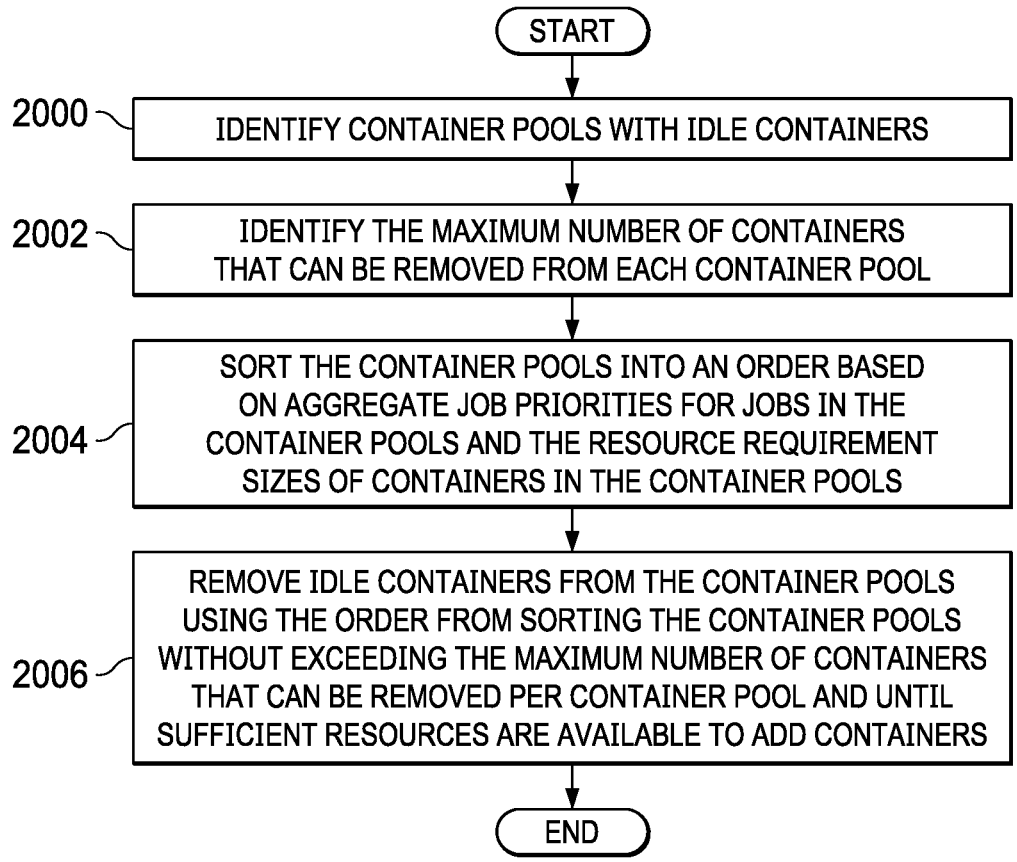
FIG. 20 is a flowchart of a process for removing idle containers in accordance with an illustrative embodiment.

Turning next to FIG. 20, a flowchart of a process for removing idle containers is depicted in accordance with an illustrative embodiment. This example is one manner in which step 1714 in FIG. 17 can be implemented to remove idle containers. The process begins by identifying container pools with idle containers (step 2000). In step 2000, an idle container can be a container that has not run a job for longer than a threshold amount of time. If a time-based job prediction is available, container pools can be identified as container pools having idle containers beyond the predicted number of required containers or beyond a predicted minimal limit number of required containers for the container pool. The prediction function provides, given a future time interval, the required number of each container type for the time interval. This function can also provide a range for each container type, where the range is the minimal required number and the maximal required number, or the function can provide any combination of minimal, maximal, and required number for each container type.

The process identifies the maximum number of containers that can be removed from each container pool (step 2002). In step 2002, the maximum number of containers is the number of idle containers in the container pool when a time-based job prediction is unavailable. If a time-based job prediction is available, the number of idle containers that can be removed is the number of idle containers beyond the predicted number of required containers or beyond the predicted minimum limit number of required containers for the container pool.

The process sorts the container pools into an order based on aggregate job priorities for jobs in the container pools and the resource requirement sizes of containers in the container pools (step 2004). In step 2004, a ratio of job priorities to resource requirement size is generated for each container pool. These ratios are sorted into ascending order. As a result, as job priorities are lower and as resource requirements are higher, a lower benefit to cost ratio is present, and, as a result, a container pool is placed in a higher ranking in the order of container pools, indicating that the container pool is a more desirable candidate for removing containers.

The process removes idle containers from the container pools using the order from sorting the container pools without exceeding the maximum number of containers that can be removed per container pool and until sufficient resources are available to add containers (step 2006). In step 2006, the maximum numbers of containers that can be removed from each container pool, which were calculated in step 2002, are used. The process terminates thereafter.

Figure 21:
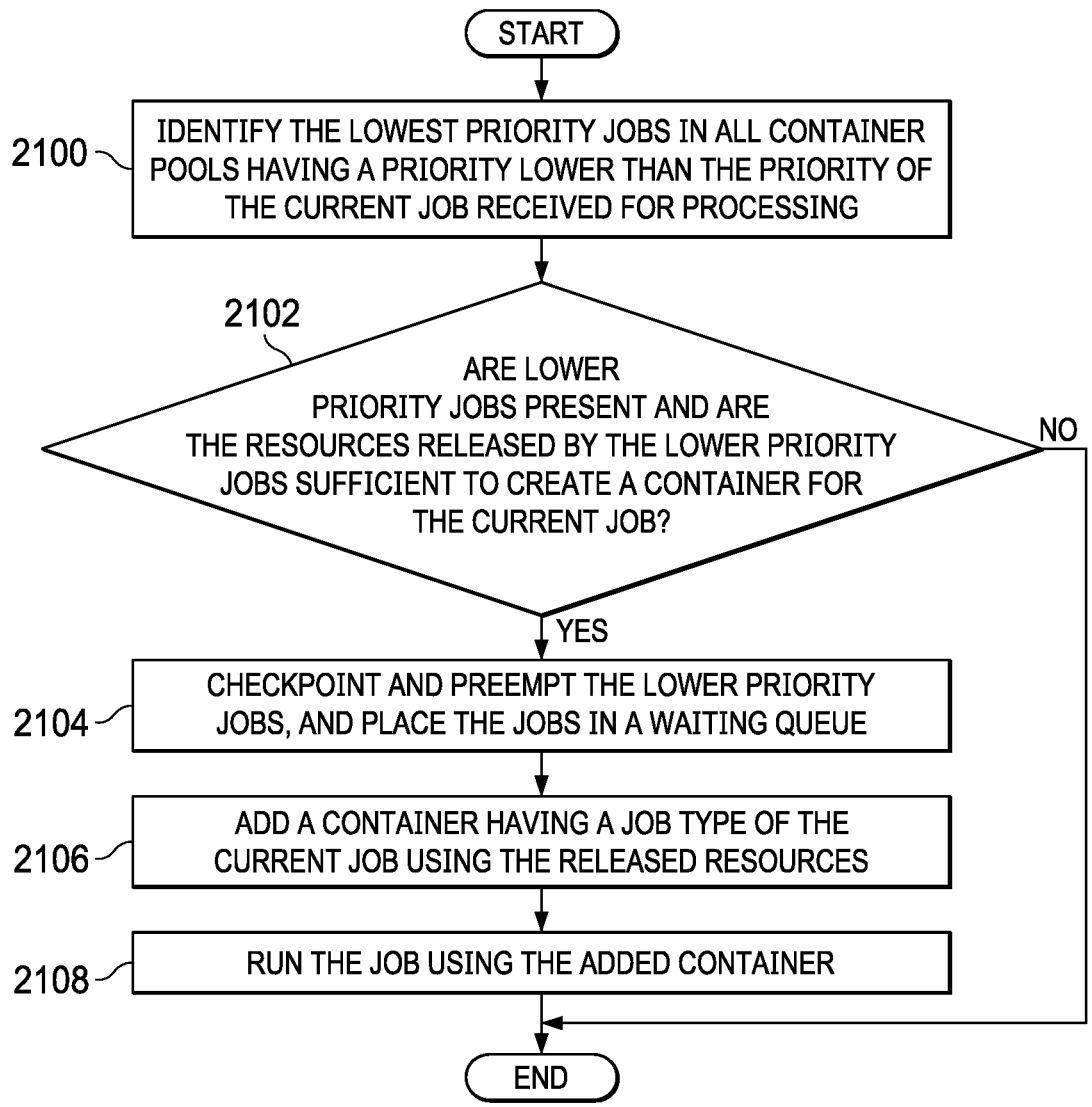
FIG. 21 is a flowchart of a process for performing job preemption in accordance with an illustrative embodiment.

Turning to FIG. 21, a flowchart of a process for performing jobs preemption is depicted in accordance with an illustrative embodiment. The process in FIG. 21 is an example of optional steps that can be performed in place of step 1712 in FIG. 17 when preemption is used.

The process begins by identifying the lowest priority jobs in all container pools having a priority lower than the priority of the current job received for processing (step 2100). A determination is made as to whether lower priority jobs are present and whether the resources released by the lower priority jobs are sufficient to create a container for the current job (step 2102). If lower priority jobs are present and the resources released from the lower priority jobs are sufficient, the process checkpoints and preempts the lower priority jobs, and places the jobs in a waiting queue (step 2104). In step 2104, the jobs are preempted to release resources for the current job.

The process adds a container having a job type of the current job using the released resources (step 2106). The process then runs the job using the added container (step 2108). The process terminates thereafter.

With reference again to step 2102, If lower priority jobs are not present or the resources released from the lower priority jobs are not sufficient, the process terminates.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program instructions, hardware, or a combination of the program instructions and hardware. When implemented in hardware, the hardware may, for example, take the form of integrated circuits that are manufactured or configured to perform one or more operations in the flowcharts or block diagrams. When implemented as a combination of program instructions and hardware, the implementation may take the form of firmware. Each block in the flowcharts or the block diagrams can be implemented using special purpose hardware systems that perform the different operations or combinations of special purpose hardware and program instructions run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 22:
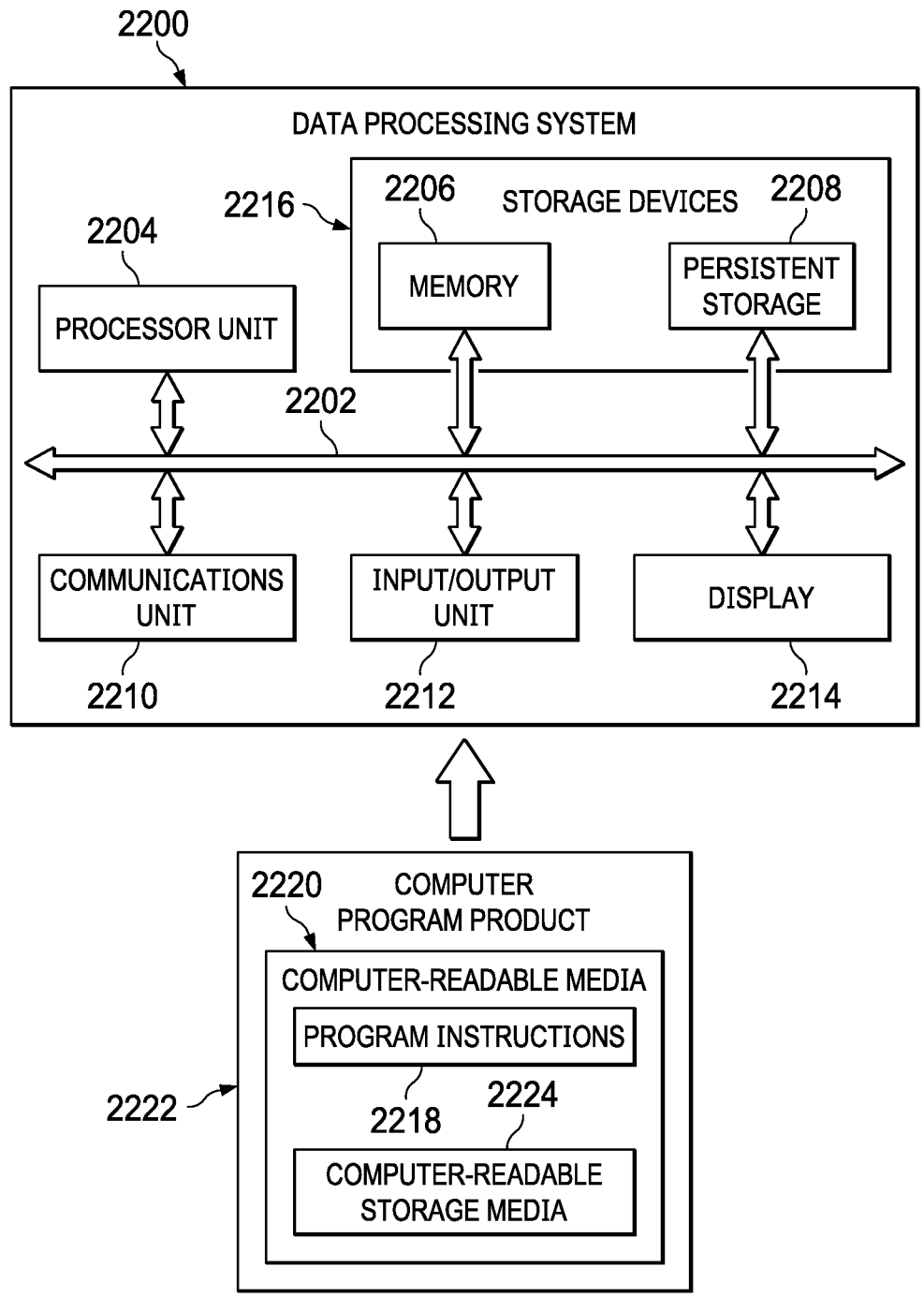
FIG. 22 is a block diagram of a data processing system in accordance with an illustrative embodiment.

Turning now to FIG. 22, a block diagram of a data processing system is depicted in accordance with an illustrative embodiment. Data processing system 2200 can be used to implement cloud computing nodes 110 in FIG. 1, personal digital assistant (PDA) or smart phone 120A, desktop computer 120B, laptop computer 120C, and/or automobile computer system 120N in FIG. 1. Data processing system 2200 can be used to implement computers in hardware and software layer 202 in FIG. 2 as well as server computer 304, server computer 306, and client devices 310 in FIG. 3. Data processing system 2200 can also be used to implement computer system 414 in FIG. 4. In this illustrative example, data processing system 2200 includes communications framework 2202, which provides communications between processor unit 2204, memory 2206, persistent storage 2208, communications unit 2210, input/output (I/O) unit 2212, and display 2214. In this example, communications framework 2202 takes the form of a bus system.

Processor unit 2204 serves to execute instructions for software that can be loaded into memory 2206. Processor unit 2204 includes one or more processors. For example, processor unit 2204 can be selected from at least one of a multicore processor, a central processing unit (CPU), a graphics processing unit (GPU), a physics processing unit (PPU), a digital signal processor (DSP), a network processor, or some other suitable type of processor. Further, processor unit 2204 can may be implemented using one or more heterogeneous processor systems in which a main processor is present with secondary processors on a single chip. As another illustrative example, processor unit 2204 can be a symmetric multi-processor system containing multiple processors of the same type on a single chip.

Memory 2206 and persistent storage 2208 are examples of storage devices 2216. A storage device is any piece of hardware that is capable of storing information, such as, for example, without limitation, at least one of data, program instructions in functional form, or other suitable information either on a temporary basis, a permanent basis, or both on a temporary basis and a permanent basis. Storage devices 2216 may also be referred to as computer-readable storage devices in these illustrative examples. Memory 2206, in these examples, can be, for example, a random-access memory or any other suitable volatile or non-volatile storage device. Persistent storage 2208 may take various forms, depending on the particular implementation.

For example, persistent storage 2208 may contain one or more components or devices. For example, persistent storage 2208 can be a hard drive, a solid-state drive (SSD), a flash memory, a rewritable optical disk, a rewritable magnetic tape, or some combination of the above. The media used by persistent storage 2208 also can be removable. For example, a removable hard drive can be used for persistent storage 2208.

Communications unit 2210, in these illustrative examples, provides for communications with other data processing systems or devices. In these illustrative examples, communications unit 2210 is a network interface card.

Input/output unit 2212 allows for input and output of data with other devices that can be connected to data processing system 2200. For example, input/output unit 2212 may provide a connection for user input through at least one of a keyboard, a mouse, or some other suitable input device. Further, input/output unit 2212 may send output to a printer. Display 2214 provides a mechanism to display information to a user.

Instructions for at least one of the operating system, applications, or programs can be located in storage devices 2216, which are in communication with processor unit 2204 through communications framework 2202. The processes of the different embodiments can be performed by processor unit 2204 using computer-implemented instructions, which may be located in a memory, such as memory 2206.

These instructions are referred to as program instructions, computer usable program instructions, or computer-readable program instructions that can be read and executed by a processor in processor unit 2204. The program instructions in the different embodiments can be embodied on different physical or computer-readable storage media, such as memory 2206 or persistent storage 2208.

Program instructions 2218 is located in a functional form on computer-readable media 2220 that is selectively removable and can be loaded onto or transferred to data processing system 2200 for execution by processor unit 2204. Program instructions 2218 and computer-readable media 2220 form computer program product 2222 in these illustrative examples. In the illustrative example, computer-readable media 2220 is computer-readable storage media 2224.

Computer-readable storage media 2224 is a physical or tangible storage device used to store program instructions 2218 rather than a medium that propagates or transmits program instructions 2218. Computer readable storage media 2224, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program instructions 2218 can be transferred to data processing system 2200 using a computer-readable signal media. The computer-readable signal media are signals and can be, for example, a propagated data signal containing program instructions 2218. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 2220" can be singular or plural. For example, program instructions 2218 can be located in computer-readable media 2220 in the form of a single storage device or system. In another example, program instructions 2218 can be located in computer-readable media 2220 that is distributed in multiple data processing systems. In other words, some instructions in program instructions 2218 can be located in one data processing system while other instructions in program instructions 2218 can be located in another data processing system. For example, a portion of program instructions 2218 can be located in computer-readable media 2220 in a server computer while another portion of program instructions 2218 can be located in computer-readable media 2220 located in a set of client computers.

Thus, the illustrative embodiments provide a computer implemented method, a computer system, and a computer program product for the computer implemented method for managing jobs using job processing pools. The computer system receives a job having a job type. The computer system identifies a job processing pool in the job processing pools for running the jobs of the job type, wherein the job processing pool comprises job processors for running the jobs of the job type and wherein another job processing pool in the job processing pools comprises other job processors for running the jobs of a different job type. The computer system runs the job having the job type using a job processor of the job type in the job processing pool for the job type. According to other illustrative embodiments, a computer system and a computer program product for managing jobs are provided.

As a result, in the illustrative of examples, one or more technical solutions can provide a technical effect of increasing the performance in running jobs in a computer system in which at least one of overall throughput of job processing is increased, wait times for running jobs is reduced, or resources held by job processors is reduced at any given time. In the illustrative example, the overall throughput in running jobs can be increased within different time intervals. Further, the wait times across the different types of jobs also can be reduced. In other words, job processors can be made available for running jobs immediately or as soon as possible. Further, to the management of containers resources held across different containers can be reduced at any given time. Further, these efficiencies can take into account job priorities in running jobs.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, To the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration, but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer implemented method for managing jobs using job processing pools, the computer implemented method comprising:

receiving, by a computer system, a job having a job type;

identifying, by the computer system, a job processing pool in the job processing pools for running the jobs of the job type, wherein each job processing pool in the job processing pools processes jobs of same job type, and wherein at least two job processing pools in the job processing pools are duplicate job processing pools for running jobs of same job type, and wherein the job processing pool comprises job processors for running the jobs of the job type and wherein another job processing pool in the job processing pools comprises other job processors for running the jobs of a different job type;

determining, by the computer system, whether a job processor of the job type can be added to the job processing pool to run the job having the job type;

adding, by the computer system, the job processor of the job type to the job processing pool in response to a determination that the job processor of the job type can be added to the job processing pool to run the job having the job type and adding the job processor of the job type to the job processing pool does not exceed a set of resource limits; and running, by the computer system, the job using the job processor of the job type.

2. The computer implemented method of claim 1, wherein running, by the computer system, the job using the job processor of the job type in the job processing pool for the job type comprises:

running, by the computer system, the job using the job processor of the job type in the job processing pool for the job type in response to the job processor in the job processing pool for the job type being available to run the job.

3. The computer implemented method of claim 1, wherein adding, by the computer system, the job processor of the job type in response to the determination that the job processor of the job type can be added to run the job having the job type comprises:
   removing, by the computer system, a set of idle job processors to free up resources for adding the job processor; and
   adding, by the computer system, the job processor of the job type to run the job having the job type.

4. The computer implemented method of claim 1, adding, by the computer system, the job processor of the job type in response to the determination that the job processor of the job type can be added to run the job having the job type comprises:
   sorting, by the computer system, the job processing pools into an order based on aggregate job priorities for the job processing pools and resource requirements for the job processors in the job processing pools;
   removing, by the computer system, idle job processors from the job processing pools having a higher ranking in the order such that sufficient resources are available to add the job processor; and
   adding, by the computer system, the job processor of the job type to the job processing pool.

5. The computer implemented method of claim 1, adding, by the computer system, the job processor of the job type in response to the determination that the job processor of the job type can be added to run the job having the job type comprises
   identifying, by the computer system, a set of candidate jobs having a priority lower than the job, wherein resource released by moving the set of candidate jobs are sufficient to add the job processor of the job type;
   placing, by the computer system, the set of candidate jobs in a waiting queue; and
   adding, by the computer system, the job processor of the job type to the job processing pool.

6. The computer implemented method of claim 1 further comprising:
   removing, by the computer system, idle job processors that have been idle beyond a threshold amount of time.

7. The computer implemented method of claim 1 further comprising:
   determining, by the computer system, a time-based job prediction for the jobs; and
   reconciling, by the computer system, a size of the job processing pools using the time-based job prediction for the jobs.

8. The computer implemented method of claim 7, wherein reconciling, by the computer system, the size of the job processing pools using the time-based job prediction for the jobs comprises:
   removing, by the computer system, current job processors from the job processing pools that require a size reduction based on the time-based job prediction; and
   adding, by the computer system, new job processors to the job processing pools based on the time-based job prediction and set of resource limits.

9. The computer implemented method of claim 8, wherein adding, by the computer system, the new job processors to the job processing pools based on the set of resource limits comprises:
   determining, by the computer system, an added resource requirement for the job processing pools that require a size increase based on the time-based job prediction;
   responsive to a determination adding the new job processors to the job processing pools does not exceed the set of resource limits, adding, by the computer system, the new job processors;
   responsive to a determination that adding the new job processors to the job processing pools exceeds the set of resource limits, sorting, by the computer system, the job processing pools into an order based on aggregate job priorities for the job processing pools and resource requirements for the job processors in the job processing pools based on the time-based job prediction for the jobs; and
   adding, by the computer system, the new job processors to the job processing pools based on the order without exceeding the set of resource limits, wherein the set of resource limits is selected from one of a global resource limit, a consumer resource limit, or per container type limit.

10. The computer implemented method of claim 1 further comprising:
    moving, by the computer system, a current job from the job processor in the job processing pool to a dedicated job processor outside of the job processing pools in response to the current job running for a period of time that exceeds a running time threshold.

11. The computer implemented method of claim 1, wherein the job processors are selected from a least one of a container, a pod, a thread, a process, an application, an operating system instance, a virtual machine, a host, or a cluster.

12. A computer implemented method for managing jobs using job processing pools, the computer implemented method comprising:
    responsive to receiving a job having a job type, determining, by a computer system, whether a container for the job type in container pools is present to run the job having the job type, wherein each container pool in the container pools run the jobs for a selected job type, and wherein at least two container pools in the container pools are duplicate job processing pools for running jobs of same job type;
    running, by the computer system, the job using the container in response to the container being available;
    determining, by the computer system, whether the container for the job type can be added without exceeding a set of resource limits in response to the container being unavailable; and
    adding, by the computer system, the container for the job type to run the job in response to a determination that the container for the job type can be added without exceeding the set of resource limits; and
    placing, by the computer system, the job in a waiting queue in in response to a determination that the container for the job type cannot be added without exceeding the set of resource limits.

13. A computer system comprising:
    a number of processor units, wherein the number of processor units executes program instructions to:
    receive a job having a job type;
    identify a job processing pool in the job processing pools for running the jobs of the job type, wherein each job processing pool in the job processing pools processes jobs of same job type, and wherein at least two job processing pools in the job processing pools are duplicate job processing pools for running jobs of same job type, and wherein the job processing pool comprises job processors for running the jobs of the job type and wherein another job processing pool in the job processing pools comprises other job processors for running the jobs of a different job type;

determining whether a job processor of the job type can be added to the job processing pool to run the job having the job type;

adding the job processor of the job type to the job processing pool in response to a determination that the job processor of the job type can be added to the job processing pool to run the job having the job type and adding the job processor of the job type to the job processing pool does not exceed a set of resource limits; and running the job using the job processor of the job type.

14. The computer system of claim 13, wherein in running the job using the job processor of the job type in the job processing pool for the job type, the number of processor units executes program instructions to:

run the job using the job processor of the job type in the job processing pool for the job type in response to the job processor in the job processing pool for the job type being available to run the job.

15. The computer system of claim 13, wherein in adding the job processor of the job type in response to the determination that the job processor of the job type can be added to run the job having the job type, the number of processor units executes program instructions to:

remove a set of idle job processors to free up resources for adding the job processor; and add the job processor of the job type to run the job having the job type.

16. The computer system of claim 13, in adding the job processor of the job type in response to the determination that the job processor of the job type can be added to run the job having the job type, the number of processor units executes program instructions to:

sort the job processing pools into an order based on aggregate job priorities for the job processing pools and resource requirements for the job processors in the job processing pools;

remove idle job processors from the job processing pools having a higher ranking in the order such that sufficient resources are available to add the job processor; and add the job processor of the job type to the job processing pool.

17. The computer system of claim 13, in adding the job processor of the job type in response to the determination that the job processor of the job type can be added to run the job having the job type, the number of processor units executes program instructions to:

identify a set of candidate jobs having a priority lower than the job, wherein resource released by moving the set of candidate jobs are sufficient to add the job processor of the job type;

place the set of candidate jobs in a waiting queue; and add the job processor of the job type to the job processing pool.

18. The computer system of claim 13, wherein the number of processor units executes program instructions to:

remove idle job processors that have been idle beyond a threshold amount of time.

19. The computer system of claim 13, wherein the number of processor units executes program instructions to:

determine a time-based job prediction for the jobs; and reconcile a size of the job processing pools using the time-based job prediction for the jobs.

20. The computer system of claim 19, wherein in reconciling the size of the job processing pools using the time-based job prediction for the jobs, the number of processor units executes program instructions to:

remove current job processors from the job processing pools that require a size reduction based on the time-based job prediction; and add new job processors to the job processing pools based on the time-based job prediction and set of resource limits.

21. The computer system of claim 20, wherein in adding the new job processors to the job processing pools based on the set of resource limits, the number of processor units executes program instructions to:

determine an added resource requirement for the job processing pools that require a size increase based on the time-based job prediction;

responsive to a determination adding the new job processors to the job processing pools does not exceed the set of resource limits, add the new job processors;

responsive to a determination that adding the new job processors to the job processing pools exceeds the set of resource limits, sort the job processing pools into an order based on aggregate job priorities for the job processing pools and resource requirements for the job processors in the job processing pools based on the time-based job prediction for the jobs; and add the new job processors to the job processing pools based on the order without exceeding the set of resource limits, wherein the set of resource limits is selected from one of a global resource limit, a consumer resource limit, or per container type limit.

22. The computer system of claim 21, wherein the number of processor units executes program instructions to:

move a current job from the job processor in the job processing pool to a dedicated job processor outside of the job processing pools in response to the current job running for a period of time that exceeds a running time threshold.

23. A computer program product for managing jobs using job processing pools, the computer program product comprising a computer readable storage medium having program instructions embodied therewith, the program instructions executable by a computer system to cause the computer system to perform a method of:

receiving, by the computer system, a job having a job type;

identifying, by the computer system, a job processing pool in the job processing pools for running the jobs of the job type, wherein each job processing pool in the job processing pools processes jobs of same job type, and wherein at least two job processing pools in the job processing pools are duplicate job processing pools for running jobs of same job type, and wherein the job processing pool comprises job processors for running the jobs of the job type and wherein another job processing pool in the job processing pools comprises other job processors for running the jobs of a different job type;

determining, by the computer system, whether a job processor of the job type can be added to the job processing pool to run the job having the job type;

adding, by the computer system, the job processor of the job type to the job processing pool in response to a determination that the job processor of the job type can be added to the job processing pool to run the job having the job type and adding the job processor of the job type to the job processing pool does not exceed a set of resource limits; and running, by the computer system, the job using the job processor of the job type.

\* \* \* \* \*